US012710503B2

(12) United States Patent
Manolakos et al.

(10) Patent No.: US 12,710,503 B2
(45) Date of Patent: Aug. 18, 2026

(54) CAPABILITIES FOR USER EQUIPMENT REGISTERED AS A REFERENCE LOCATION DEVICE AND A LOCATION-TARGET DEVICE

(71) Applicant: QUALCOMM Incorporated, San Diego, CA (US)

(72) Inventors: Alexandros Manolakos, Athens (GR); Mukesh Kumar, Hyderabad (IN); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 322 days.

(21) Appl. No.: 18/698,065

(22) PCT Filed: Nov. 9, 2022

(86) PCT No.: PCT/US2022/049411
§ 371 (c)(1),
(2) Date: Apr. 3, 2024

(87) PCT Pub. No.: WO2023/107231
PCT Pub. Date: Jun. 15, 2023

(65) Prior Publication Data

US 2024/0410970 A1 Dec. 12, 2024

(30) Foreign Application Priority Data

Dec. 6, 2021 (GR) .............................. 20210100850

(51) Int. Cl.
*G01S 5/02* (2010.01)
*H04W 4/029* (2018.01)
*H04W 64/00* (2009.01)

(52) U.S. Cl.
CPC ........... *G01S 5/0236* (2013.01); *H04W 4/029* (2018.02); *H04W 64/003* (2013.01)

(58) Field of Classification Search
CPC ........ G01S 5/02; G01S 5/0236; H04W 4/029; H04W 64/003; H04W 8/22
See application file for complete search history.

(56) References Cited

U.S. PATENT DOCUMENTS

2020/0383083 A1* 12/2020 Edge ..................... G01S 5/0045
2021/0099965 A1* 4/2021 Manolakos ........... G01S 13/878
(Continued)

FOREIGN PATENT DOCUMENTS

WO 2010124011 A2 10/2010

OTHER PUBLICATIONS

International Search Report and Written Opinion—PCT/US2022/049411—ISA/EPO—Mar. 1, 2023.

*Primary Examiner* — Siu M Lee
(74) *Attorney, Agent, or Firm* — QUALCOMM Incorporated

(57) ABSTRACT

Techniques are provided for utilizing a user equipment (UE) which is registered as a reference location device (RLD) and a location-target device. An example method of obtaining and reporting reference signal measurements includes providing an indication of a capability to operate as a reference location device and a location-target device, receiving assistance data associated with at least two positioning sessions occurring simultaneously, wherein a first positioning session is associated with the capability to operate as the reference location device and a second positioning session associated with the capability to operate as the location-target device, obtaining one or more reference signal measurements based
(Continued)

at least in part on the assistance data, and reporting the one or more of the reference signal measurements to a positioning entity.

30 Claims, 19 Drawing Sheets

(56) References Cited

U.S. PATENT DOCUMENTS

| | | | | |
|---|---|---|---|---|
| 2021/0368297 | A1 | 11/2021 | Lin et al. | |
| 2022/0303725 | A1 * | 9/2022 | Barbu | H04W 64/00 |

* cited by examiner

1100

1105

1110

UE gNB

1102a

1104

1104a

DL PRS

UE Rx-Tx measurement gNB RTT measurement

1106

UL PRS

1104b

1102b

1105a

1110a

BB Ant. Ant. BB

CAPABILITIES FOR USER EQUIPMENT REGISTERED AS A REFERENCE LOCATION DEVICE AND A LOCATION-TARGET DEVICE

CROSS-REFERENCE TO RELATED APPLICATION

This application is the National Stage of International Application No. PCT/US2022/049411, filed Nov. 9, 2022, entitled "CAPABILITIES FOR USER EQUIPMENT REGISTERED AS A REFERENCE LOCATION DEVICE AND A LOCATION-TARGET DEVICE," which claims the benefit of Greek Patent Application No. 20210100850, filed Dec. 6, 2021, entitled "CAPABILITIES FOR USER EQUIPMENT REGISTERED AS A REFERENCE LOCATION DEVICE AND A LOCATION-TARGET DEVICE," both of which is are assigned to the assignee hereof, and the entire contents of both of which are hereby incorporated herein by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), and a fifth generation (5G) service (e.g., 5G New Radio (NR)). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

It is often desirable to know the location of a user equipment (UE), e.g., a cellular phone, with the terms "location" and "position" being synonymous and used interchangeably herein. A location services (LCS) client may desire to know the location of the UE and may communicate with a location center in order to request the location of the UE. The location center and the UE may exchange messages, as appropriate, to obtain a location estimate for the UE. The location center may return the location estimate to the LCS client, e.g., for use in one or more applications.

Obtaining the location of a mobile device that is accessing a wireless network may be useful for many applications including, for example, emergency calls, personal navigation, asset tracking, locating a friend or family member, etc. Existing positioning methods include methods based on measuring radio signals transmitted from a variety of devices including satellite vehicles and terrestrial radio sources in a wireless network such as base stations and access points. Stations in a wireless network may be configured to transmit reference signals to enable mobile device to perform positioning measurements. In some use cases, a mobile device may be configured as a reference location device to enhance the positioning accuracy of positioning measurements.

SUMMARY

An example method of obtaining and reporting reference signal measurements according to the disclosure includes providing an indication of a capability to operate as a reference location device and a location-target device, receiving assistance data associated with at least two positioning sessions occurring simultaneously, wherein a first positioning session is associated with the capability to operate as the reference location device and a second positioning session associated with the capability to operate as the location-target device, obtaining one or more reference signal measurements based at least in part on the assistance data, and reporting the one or more of the reference signal measurements to a positioning entity.

An example method for receiving reference signal measurement values according to the disclosure includes receiving capability information from a user equipment configured to operate in a reference node mode and a regular mode, providing assistance data associated with at least two positioning sessions occurring simultaneously, wherein a first positioning session is associated reference signals to be received by a reference location device, and a second positioning session associated with determining a location of the user equipment, and receiving reference signal measurement values associated with the assistance data.

Items and/or techniques described herein may provide one or more of the following capabilities, as well as other capabilities not mentioned. A communication network may include reference nodes at known locations to assist with user equipment positioning. Reference signals received by a user equipment and a reference node may be compared to estimate timing and group errors associated with the reference signals. A user equipment may be configured to operate as a reference node and location-target device simultaneously. The user equipment may be jointly registered on a network as both a reference location device and a location-target device. A network server may be configured to provide assistance data associated with reference signals to be received by the user equipment while operating as a reference node, and reference signals used for determining the position of the user equipment. The user equipment may receive a first set of reference signals and report measurements while operating as a reference node, and simultaneously receive a second set of reference signals and report measurements to determine the current location of the user equipment. The first and second sets of reference signals may be in different frequency layers and/or different bands. The latency of network positioning methods may be reduced. Other capabilities may be provided and not every implementation according to the disclosure must provide any, let alone all, of the capabilities discussed.

DETAILED DESCRIPTION

Techniques are discussed herein for utilizing a user equipment (UE) which is registered as a reference location device (RLD) and a location-target device. The terms RLD and reference node may be used synonymously herein. In general, a RLD may be a UE, or another station such as a base station (BS) configured to receive positioning reference signals (PRSs) and communicate with a wireless network. The reference node is in a known location relative to other stations and is configured to measure positioning reference signals (PRSs) transmitted by the other stations. Since the distance between the reference node and the other stations is known, the theoretical propagation times for the positioning reference signals is known. Deviations between the theoretical propagation times and the time of flight measured by a reference node may be used to compensate time of flight measurements obtained by a proximate UE with an unknown location. The compensation information may be based on time of arrival (ToA) measurements for a PRS or on reference signal time differences (RSTD) for two or more PRS received by the reference node.

The techniques discussed herein may be utilized when a UE is registered on a network as a RLD and a location-target device simultaneously. As a RLD, the UE may provide time of flight information for positioning reference signals as described above. As a location-target device, the UE may measure positioning reference signals to determine a current position of the UE. For example, a UE may have a known location with a first uncertainty value (e.g., 3 m), which may be sufficient for performing the functions of a RLD in some use cases. A network server, such as a location management function (LMF) may request that the UE determine a location with a second uncertainty value (e.g., 10 cm) and thus may request the UE to obtain measurements as a location-target device while simultaneously obtaining measurements as an RLD. The LMF may be configured to utilize the positioning measurements obtained by the UE to compensate the time of flight measurements obtained by proximate UEs with unknown locations. These techniques and configurations are examples, and other techniques and configurations may be used.

Figure 1:
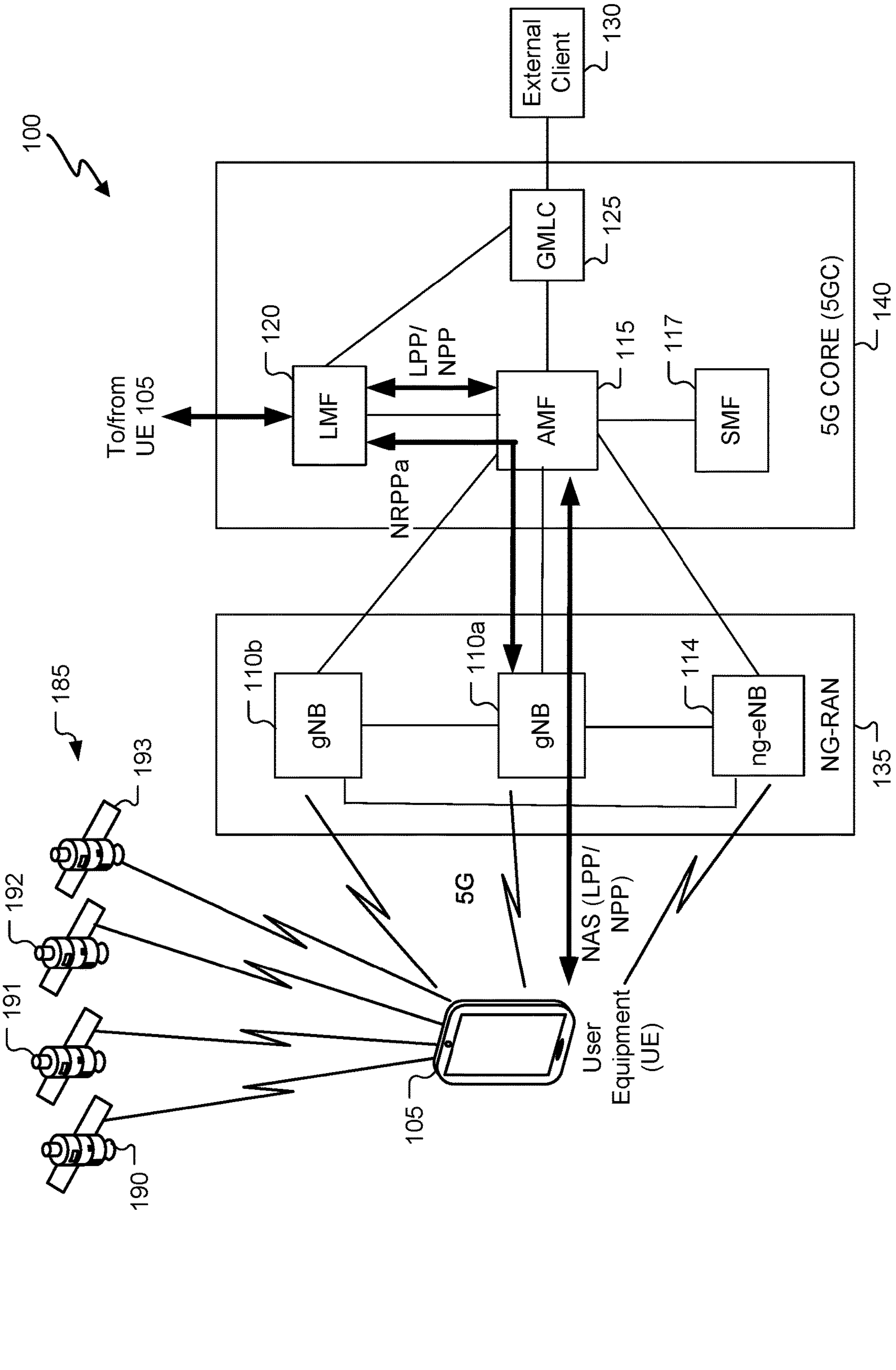
FIG. 1 is a simplified diagram of an example wireless communications system.

Referring to FIG. 1, an example of a communication system 100 includes a UE 105, a Radio Access Network (RAN) 135, here a Fifth Generation (5G) Next Generation (NG) RAN (NG-RAN), and a 5G Core Network (5GC) 140. The UE 105 may be, e.g., an IoT device, a location tracker device, a cellular telephone, or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110*a*, 110*b*, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110*a*, 110*b* and the ng-eNB 114 are communicatively coupled to each other, are each configured to bi-directionally wirelessly communicate with the UE 105, and are each communicatively coupled to, and configured to bi-directionally communicate with, the AMF 115. The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110*a*, 110*b*, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110*a*, 110*b*, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110*a*, 110*b* are examples and may, in various embodiments, be replaced by or include various other location server functionality and/or base station functionality respectively.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g. the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The BSs, such as the gNB 110*a*, the gNB 110*b*, the ng-eNB 114, may each comprise one or more TRPs. For example, each sector within a cell of a BS may comprise a TRP, although multiple TRPs may share one or more components (e.g., share a processor but have separate antennas). The communication system 100 may include macro TRPs or the communication system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications. The LMF 120 may support positioning of the UE 105 when the UE 105 accesses the NG-RAN 135 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g. by the LMF 120).

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though one of these connections may be supported by the 5GC 140 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS transmissions from the gNBs 110*a*, 110*b*, and/or the ng-eNB 114.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time Of Arrival (TOA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110*a*, 110*b*, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS beams from a plurality of base stations (such as the gNBs 110*a*, 110*b*, the ng-eNB 114, etc.) to compute the UE's position.

Figure 2:
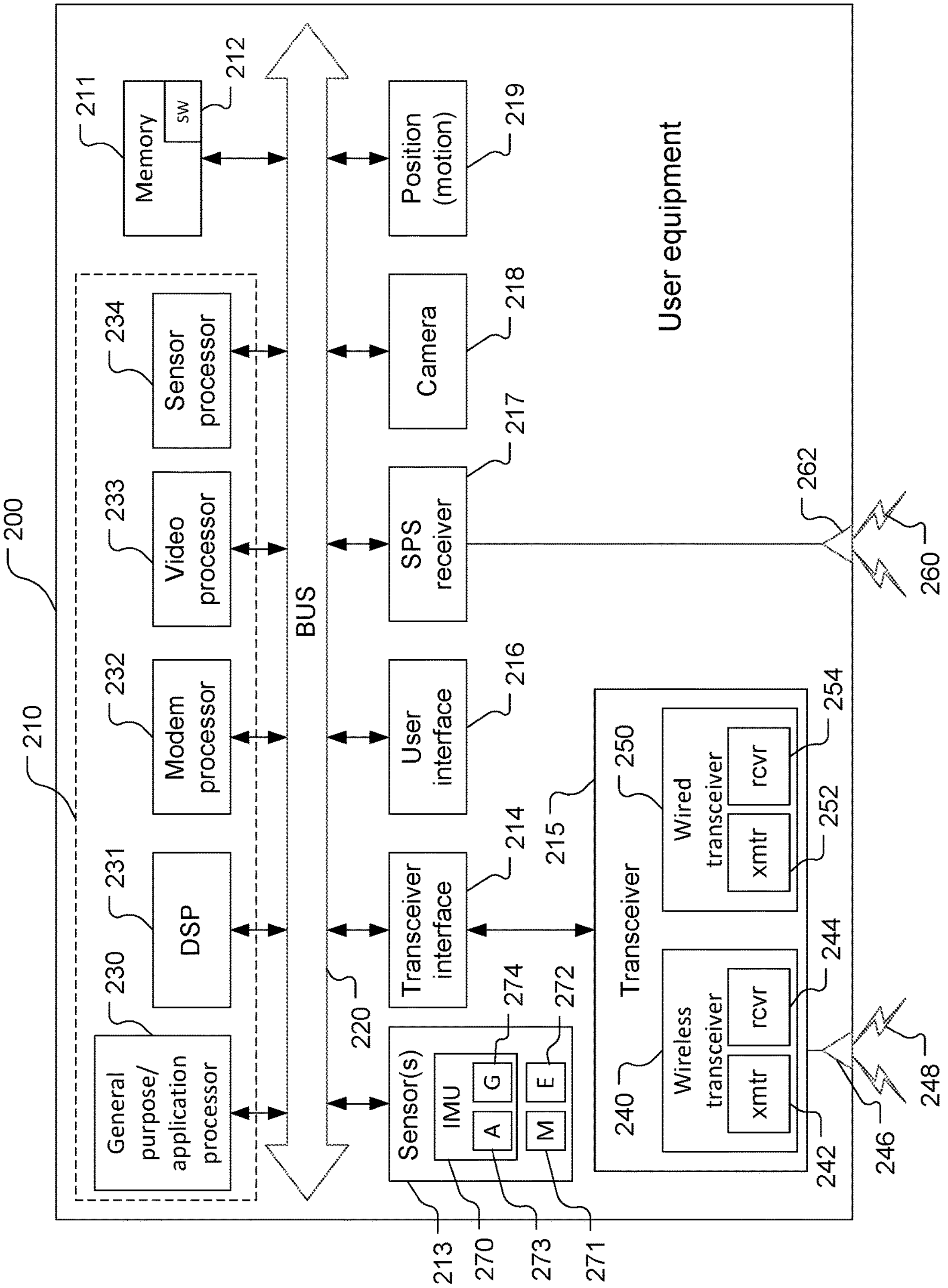
FIG. 2 is a block diagram of components of an example user equipment.

Referring also to FIG. 2, a UE 200 is an example of the UE 105 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position (motion) device 219. The processor 210, the memory 211, the sensor(s) 213, the transceiver interface 214, the user interface 216, the SPS receiver 217, the camera 218, and the position (motion) device 219 may be communicatively coupled to each other by a bus 220 (which may be configured, e.g., for optical and/or electrical communication). One or more of the shown apparatus (e.g., the camera 218, the position (motion) device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing, and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PMD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise one or more inertial sensors, for example, one or more accelerometers 273 (e.g., collectively responding to acceleration of the UE 200 in three dimensions) and/or one or more gyroscopes 274. The magnetometer(s) may provide measurements to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) 271 may include a two-dimensional magnetometer configured to detect and provide indications of magnetic field strength in two orthogonal dimensions. Also or alternatively, the magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a transmitter 242 and receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the transmitter 242 may include multiple transmitters that may be discrete components or combined/integrated components, and/or the receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-Vehicle-to-Everything (V2X) (PC5), V2C (Uu), IEEE 802.11 (including IEEE 802.11p), WiFi, WiFi Direct (WiFi-D), Bluetooth®, Zigbee etc. NR systems may be configured to operate on different frequency layers such as FR1 (e.g., 410-7125 MHz) and FR2 (e.g., 24.25-52.6 GHz), and may extend into new bands such as sub-6 GHz and/or 100 GHz and higher (e.g., FR2x, FR3, FR4). The wired transceiver 250 may include a transmitter 252 and a receiver 254 configured for wired communication, e.g., with the NG-RAN 135 to send communications to, and receive communications from, the gNB 110*a*, for example. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position (motion) device (PMD) 219 may be configured to determine a position and possibly motion of the UE 200. For example, the PMD 219 may communicate with, and/or include some or all of, the SPS receiver 217. The PMD 219 may also or alternatively be configured to determine location of the UE 200 using terrestrial-based signals (e.g., at least some of the signals 248) for trilateration, for assistance with obtaining and using the SPS signals 260, or both. The PMD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PMD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose processor 230 and/or the DSP 231) may be configured to use to determine motion (e.g., a velocity vector and/or an acceleration vector) of the UE 200. The PMD 219 may be configured to provide indications of uncertainty and/or error in the determined position and/or motion.

Figure 3:
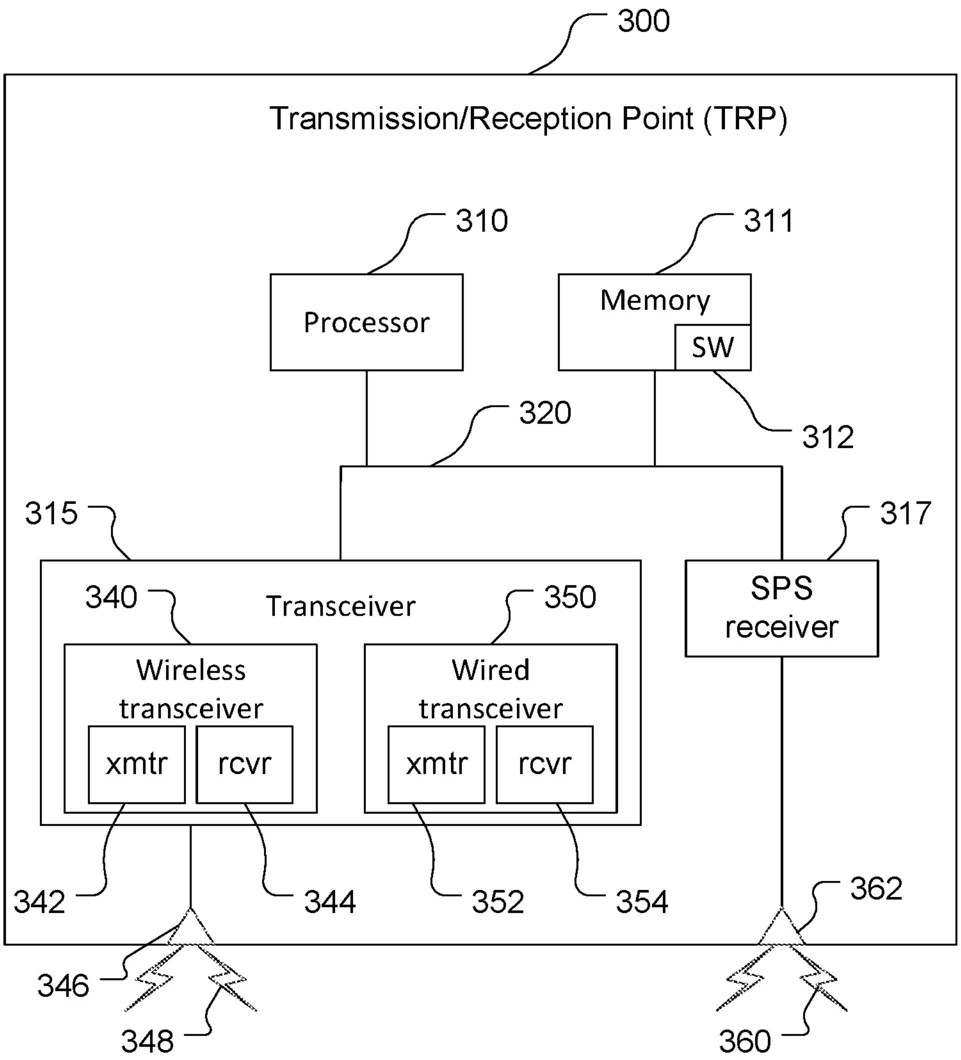
FIG. 3 is a block diagram of components of an example transmission/reception point.

Referring also to FIG. 3, an example of a TRP 300 of the gNB 110*a*, gNB 110*b*, ng-eNB 114 comprises a computing platform including a processor 310, memory 311 including software (SW) 312, a transceiver 315, and (optionally) an SPS receiver 317. The processor 310, the memory 311, the transceiver 315, and the SPS receiver 317 may be communicatively coupled to each other by a bus 320 (which may be configured, e.g., for optical and/or electrical communication). One or more of the shown apparatus (e.g., a wireless interface and/or the SPS receiver 317) may be omitted from the TRP 300. The SPS receiver 317 may be configured similarly to the SPS receiver 217 to be capable of receiving and acquiring SPS signals 360 via an SPS antenna 362. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the gNB 110*a*, gNB 110*b*, ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels) and/or receiving (e.g., on one or more downlink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a transmitter 352 and a receiver 354 configured for wired communication, e.g., with the network 140 to send communications to, and receive communications from, the LMF 120 or other network server, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
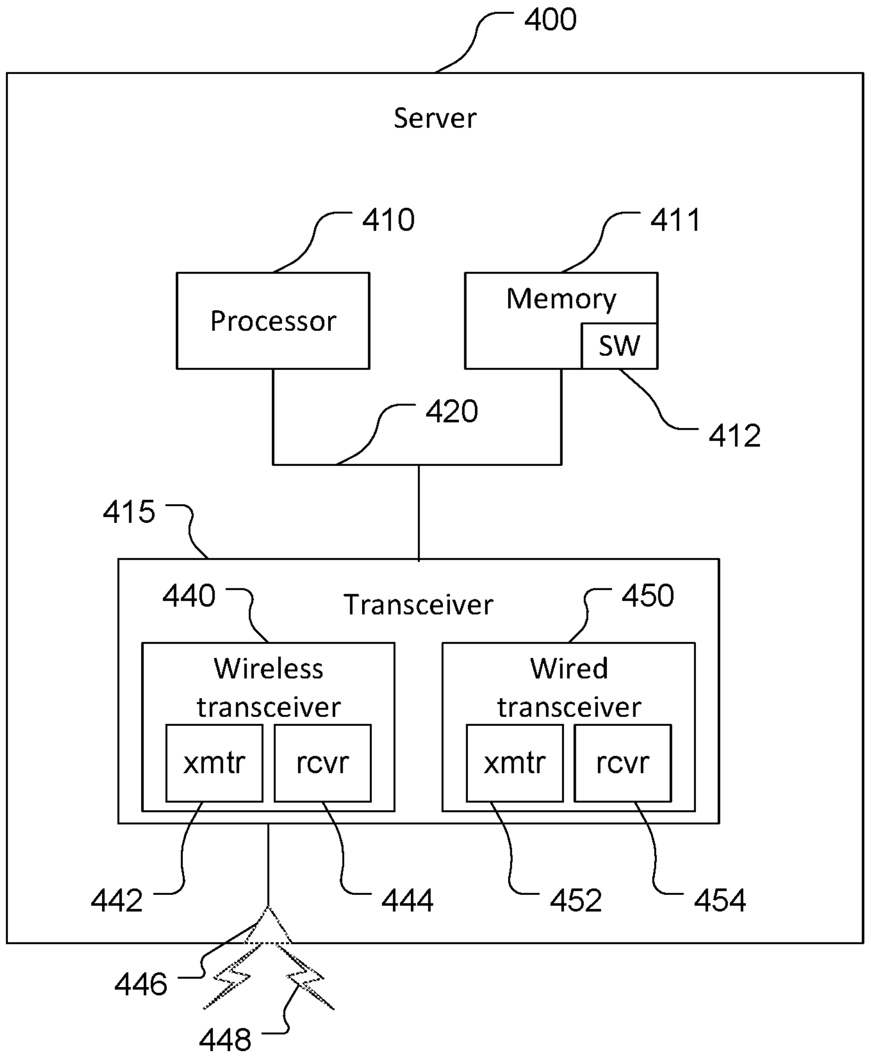
FIG. 4 is a block diagram of components of an example server.

Referring also to FIG. 4, an example server, such as the LMF 120, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 (or the LMF 120) performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the transmitter 442 may include multiple transmitters that may be discrete components or combined/integrated components, and/or the receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a transmitter 452 and a receiver 454 configured for wired communication, e.g., with the NG-RAN 135 to send communications to, and receive communications from, the TRP 300, for example. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Figure 5A:
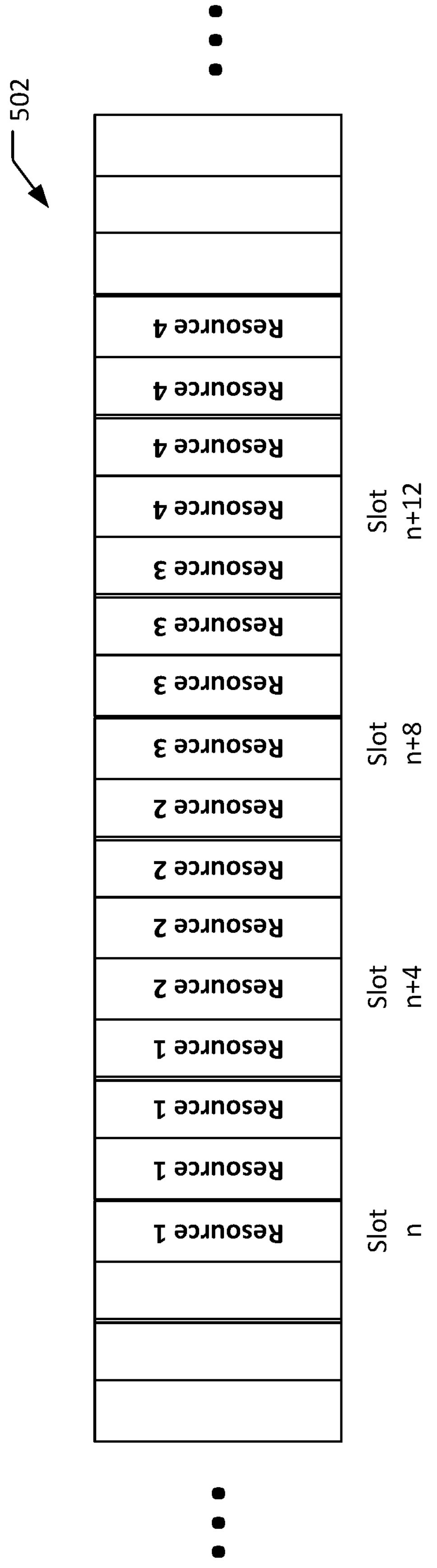
FIGS. 5A and 5B illustrate example downlink positioning reference signal resource sets.
Figure 5B:
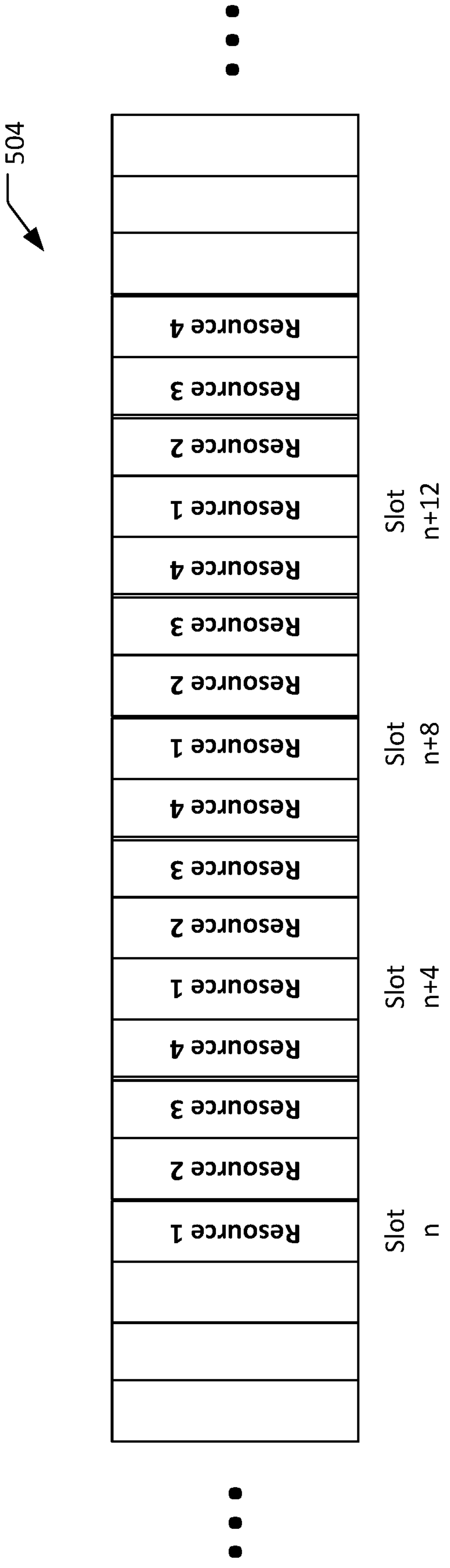

Referring to FIGS. 5A and 5B, example downlink PRS resource sets are shown. In general, a PRS resource set is a collection of PRS resources across one base station (e.g., TRP 300) which have the same periodicity, a common muting pattern configuration and the same repetition factor across slots. A first PRS resource set 502 includes 4 resources and a repetition factor of 4, with a time-gap equal to 1 slot. A second PRS resource set 504 includes 4 resources and a repetition factor of 4 with a time-gap equal to 4 slots. The repetition factor indicates the number of times each PRS resource is repeated in each single instance of the PRS resource set (e.g., values of 1, 2, 4, 6, 8, 16, 32). The time-gap represents the offset in units of slots between two repeated instances of a PRS resource corresponding to the same PRS resource ID within a single instance of the PRS resource set (e.g., values of 1, 2, 4, 8, 16, 32). The time duration spanned by one PRS resource set containing repeated PRS resources does not exceed PRS-periodicity. The repetition of a PRS resource enables receiver beam sweeping across repetitions and combining RF gains to increase coverage. The repetition may also enable intra-instance muting.

Figure 6:
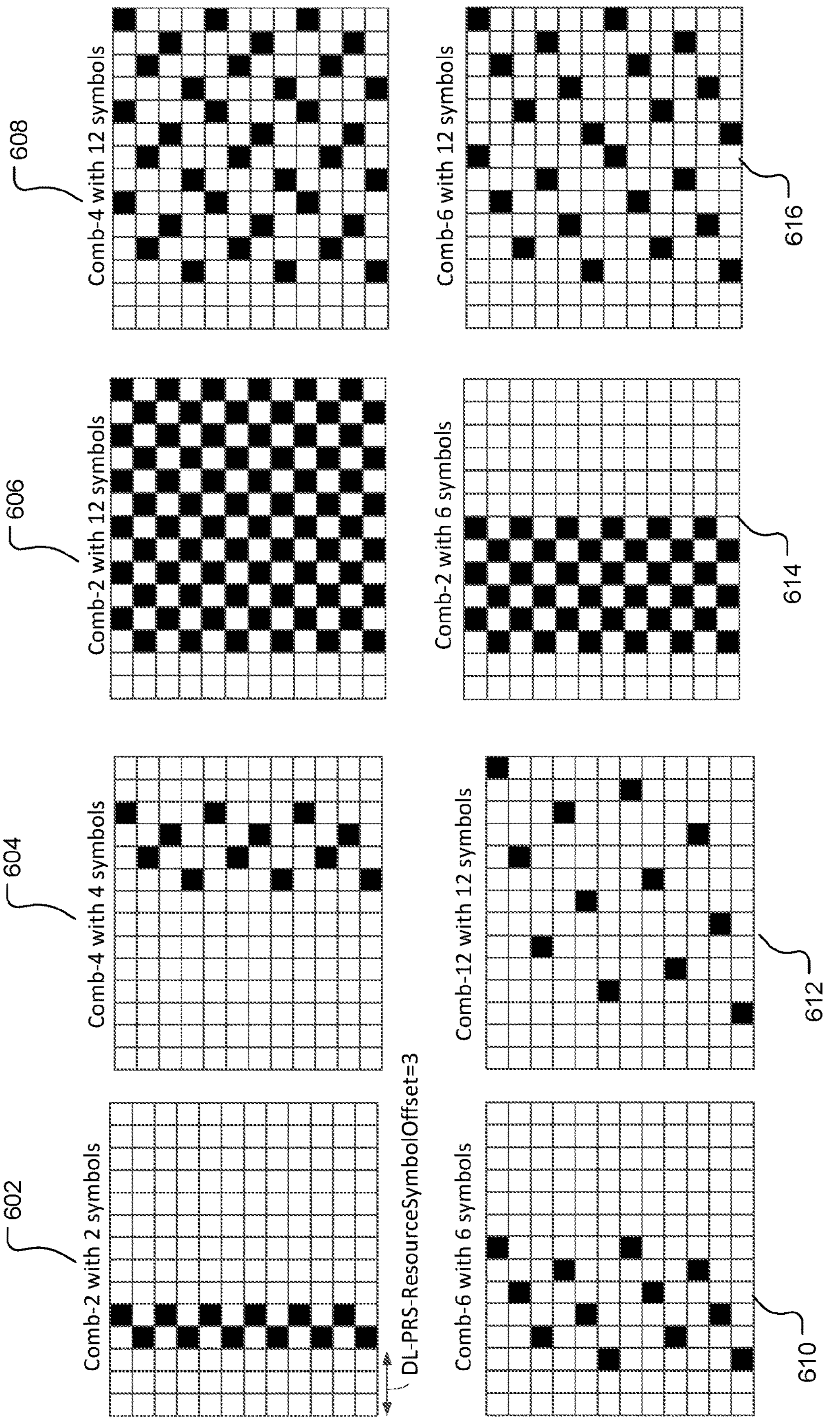
FIG. 6 is an illustration of example subframe formats for positioning reference signal transmission.

Referring to FIG. 6, example subframe and slot formats for positioning reference signal transmissions are shown. The example subframe and slot formats are included in the PRS resource sets depicted in FIGS. 5A and 5B. The subframes and slot formats in FIG. 6 are examples and not limitations and include a comb-2 with 2 symbols format 602, a comb-4 with 4 symbols format 604, a comb-2 with 12 symbols format 606, a comb-4 with 12 symbols format 608, a comb-6 with 6 symbols format 610, a comb-12 with 12 symbols format 612, a comb-2 with 6 symbols format 614, and a comb-6 with 12 symbols format 616. In general, a subframe may include 14 symbol periods with indices 0 to 13. The subframe and slot formats may be used for a Physical Broadcast Channel (PBCH). Typically, a base station may transmit the PRS from antenna port 6 on one or more slots in each subframe configured for PRS transmission. The base station may avoid transmitting the PRS on resource elements allocated to the PBCH, a primary synchronization signal (PSS), or a secondary synchronization signal (SSS) regardless of their antenna ports. The cell may generate reference symbols for the PRS based on a cell ID, a symbol period index, and a slot index. Generally, a UE may be able to distinguish the PRS from different cells.

A base station may transmit the PRS over a particular PRS bandwidth, which may be configured by higher layers. The base station may transmit the PRS on subcarriers spaced apart across the PRS bandwidth. The base station may also transmit the PRS based on the parameters such as PRS periodicity TPRS, subframe offset PRS, and PRS duration NPRS. PRS periodicity is the periodicity at which the PRS is transmitted. The PRS periodicity may be, for example, 160, 320, 640 or 1280 ms. Subframe offset indicates specific subframes in which the PRS is transmitted. And PRS duration indicates the number of consecutive subframes in which the PRS is transmitted in each period of PRS transmission (PRS occasion). The PRS duration may be, for example, 1, 2, 4 or 6 ms.

The PRS periodicity TPRS and the subframe offset PRS may be conveyed via a PRS configuration index IPRS. The PRS configuration index and the PRS duration may be configured independently by higher layers. A set of NPRS consecutive subframes in which the PRS is transmitted may be referred to as a PRS occasion. Each PRS occasion may be enabled or muted, for example, the UE may apply a muting bit to each cell. A PRS resource set is a collection of PRS resources across a base station which have the same periodicity, a common muting pattern configuration, and the same repetition factor across slots (e.g., 1, 2, 4, 6, 8, 16, 32 slots).

In general, the PRS resources depicted in FIGS. 5A and 5B may be a collection of resource elements that are used for transmission of PRS. The collection of resource elements can span multiple physical resource blocks (PRBs) in the frequency domain and N (e.g., 1 or more) consecutive symbol(s) within a slot in the time domain. In a given OFDM symbol, a PRS resource occupies consecutive PRBs. A PRS resource is described by at least the following parameters: PRS resource identifier (ID), sequence ID, comb size-N, resource element offset in the frequency domain, starting slot and starting symbol, number of symbols per PRS resource (i.e., the duration of the PRS resource), and QCL information (e.g., QCL with other DL reference signals). Currently, one antenna port is supported. The comb size indicates the number of subcarriers in each symbol carrying PRS. For example, a comb-size of comb-4 means that every fourth subcarrier of a given symbol carries PRS.

A PRS resource set is a set of PRS resources used for the transmission of PRS signals, where each PRS resource has a PRS resource ID. In addition, the PRS resources in a PRS resource set are associated with the same transmission-reception point (e.g., a TRP 300). Each of the PRS resources in the PRS resource set have the same periodicity, a common muting pattern, and the same repetition factor across slots. A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. Note that this does not have any implications on whether the base stations and the beams on which PRS are transmitted are known to the UE.

Figure 7:
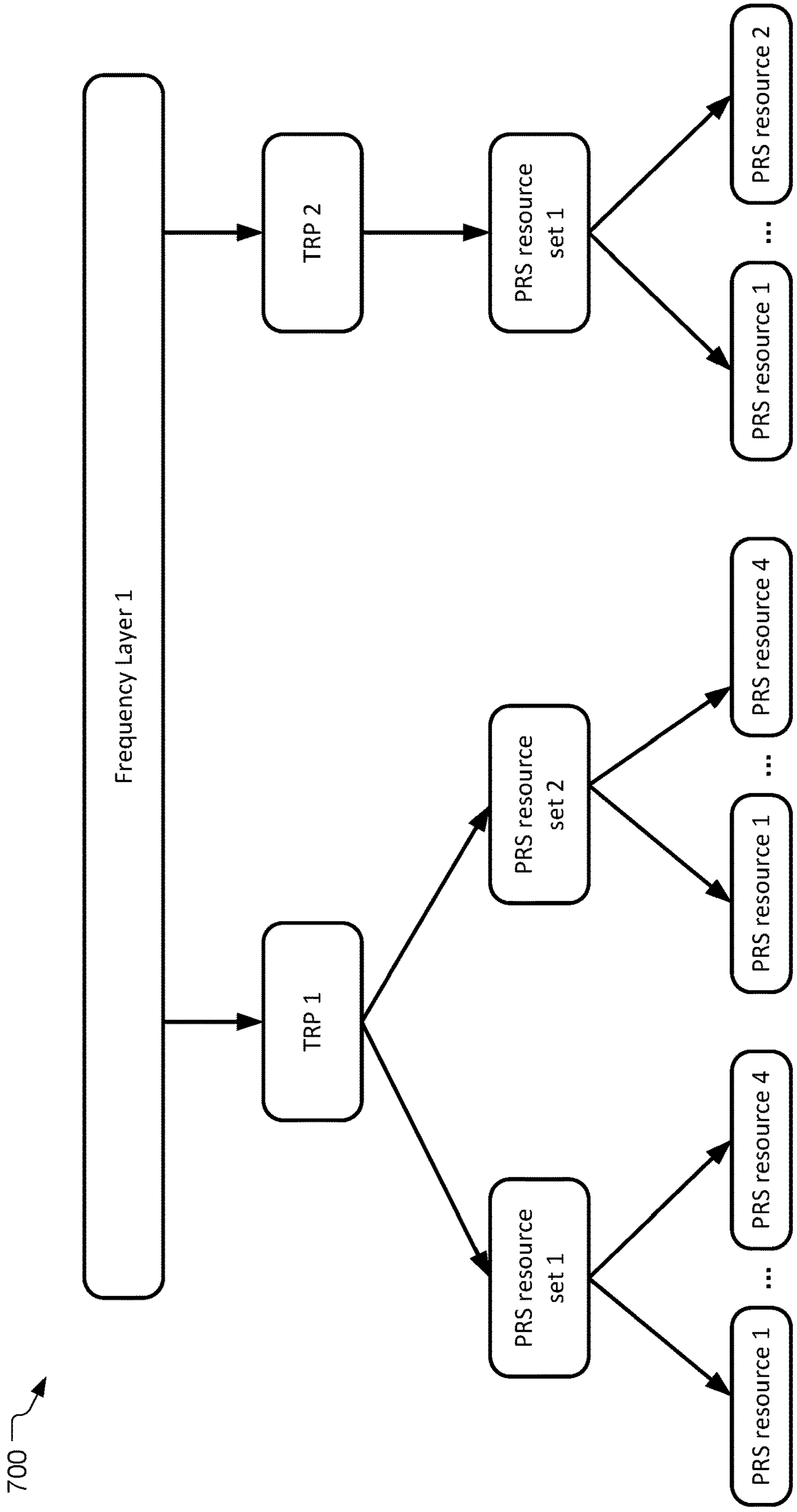
FIG. 7 is a diagram of an example frequency layer.

Referring to FIG. 7, a diagram of an example frequency layer 700 is shown. In an example, the frequency layer 700 also referred to as a positioning frequency layer, may be a collection of PRS resource sets across one or more TRPs. The positioning frequency layer may have the same subcarrier spacing (SCS) and cyclic prefix (CP) type, the same point-A, the same value of DL PRS Bandwidth, the same start PRB, and the same value of comb-size. The numerologies supported for PDSCH may be supported for PRS. Each of the PRS resource sets in the frequency layer 700 is a collection of PRS resources across one TRP which have the same periodicity, a common muting pattern configuration, and the same repetition factor across slots.

Note that the terms positioning reference signal and PRS are reference signals that can be used for positioning, such as but not limited to, PRS signals, navigation reference signals (NRS) in 5G, downlink position reference signals (DL-PRS), uplink position reference signals (UL-PRS), tracking reference signals (TRS), cell-specific reference signals (CRS), channel state information reference signals (CSI-RS), primary synchronization signals (PSS), secondary synchronization signals (SSS), sounding reference signals (SRS), etc.

The ability of a UE to process PRS signals may vary based on the capabilities of the UE. In general, however, industry standards may be developed to establish a common PRS capability for UEs in a network. For example, an industry standard may require that a duration of DL PRS symbol in units of milliseconds (ms) a UE can process every T ms assuming a maximum DL PRS bandwidth in MHz, which is supported and reported by UE. As examples, and not limitations, the maximum DL PRS bandwidth for the FR1 bands may be 5, 10, 20, 40, 50, 80, 100 MHz, and for the FR2 bands may be 50, 100, 200, 400 MHz. The standards may also indicate a DL PRS buffering capability as a Type 1 (i.e., sub-slot/symbol level buffering), or a Type 2 (i.e., slot level buffering). The common UE capabilities may indicate a duration of DL PRS symbols N in units of ms a UE can process every T ms assuming maximum DL PRS bandwidth in MHz, which is supported and reported by a UE. Example T values may include 8, 16, 20, 30, 40, 80, 160, 320, 640, 1280 ms, and example N values may include 0.125, 0.25, 0.5, 1, 2, 4, 6, 8, 12, 16, 20, 25, 30, 32, 35, 40, 45, 50 ms. A UE may be configured to report a combination of (N, T) values per band, where N is a duration of DL PRS symbols in ms processed every T ms for a given maximum bandwidth (B) in MHz supported by a UE. In general, a UE may not be expected to support a DL PRS bandwidth that exceeds the reported DL PRS bandwidth value. The UE DL PRS processing capability may be defined for a single positioning frequency layer 700. The UE DL PRS processing capability may be agnostic to DL PRS comb factor configurations such as depicted in FIG. 6. The UE processing capability may indicate a maximum number of DL PRS resources that a UE can process in a slot under it. For example, the maximum number for FR1 bands may be 1, 2, 4, 6, 8, 12, 16, 24, 32, 48, 64 for each SCS: 15 kHz, 30 kHz, 60 kHz, and the maximum number for the FR2 bands may be 1, 2, 4, 6, 8, 12, 16, 24, 32, 48, 64 for each SCS: 15 kHz, 30 kHz, 60 kHz, 120 kHz.

Figure 8:
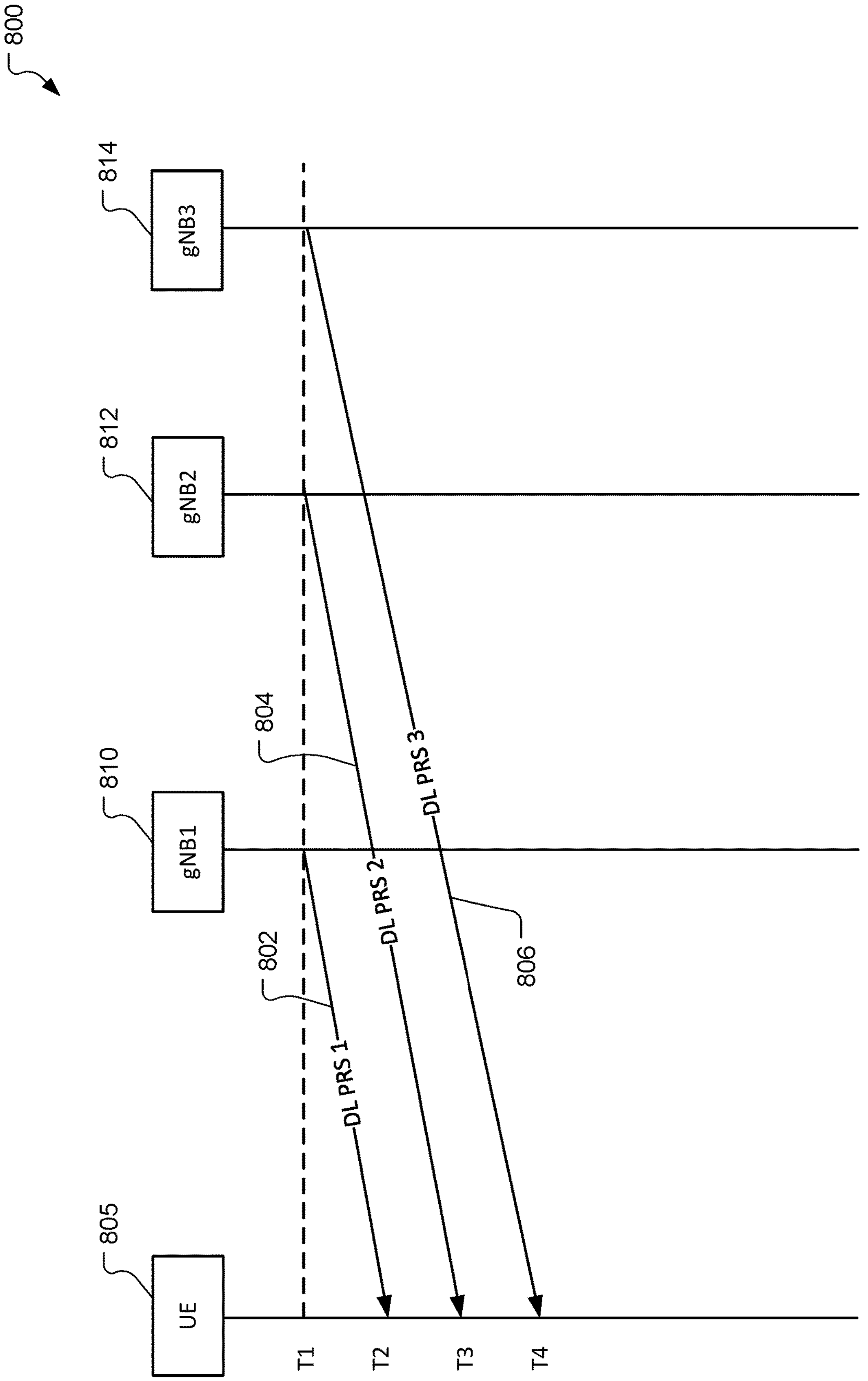
FIG. 8 is an example message flow for a time of arrival based position estimate.

Referring to FIG. 8, an example message flow 800 for time of arrival (ToA) based position flow between a user equipment 805 and a plurality of base stations is shown. The UE 805 is an example of the UE 105, 200 and a first base station 810, a second base station 812 and a third base station 814 are examples of a gNB 110*a-b* or ng-eNB 114. The number of base stations and message formats in the message flow 800 are examples and not limitations as other numbers and formats may be used. ToA based positioning methods utilize the precise measurements of the arrival time of signals transmitted from one or more base stations to a user equipment, or vice versa. For example, the first base station 810 may be configured to transmit a first DL PRS 802 at time T1, the second base station 812 may be configured to transmit a second DL PRS 804 at time T1, and the third base station 814 may be configured to transmit a third DL PRS 806 at time T1. The transmit times and signal format are examples to describe the concepts of ToA lateration techniques. The distance between the UE 805 and the respective base stations 810, 812, 814 is based on the propagation time of the respective PRS 802, 804, 806. That is, the signals travel with a known velocity (e.g., approximately the speed of light (c) or ~300 meters per microsecond), and the distance can be determined from the elapsed propagation time. ToA based positioning requires precise knowledge of the transmission start time(s), and that all stations are accurately synchronized with a precise time source. Using the propagation speed and measured time, a distance (D) between the UE 805 and respective base station may be expressed as:

$$D = c * (t) \tag{1}$$

where:

D=distance (meters);

c=propagation speed of ~300 meters/microsecond;

t=time in microseconds.

For example, the distance between the UE 805 and the first base station 810 is c*(T2–T1), the distance between the UE 805 and the second base station 812 is c*(T3–T1), and the distance between the UE 805 and the third base station 814 is c*(T4–T1). The stations may use other transmission times (i.e., not all stations must transmit at time T1). Using the respective distances as a radius, a circular representation of the area around the base stations may be used to determine a position estimate for the UE 805 (e.g., using trilateration). Additional stations may be used (e.g., using multilateration techniques). ToA positioning methods may be used for two-dimensional as well as three-dimensional position estimates. Three-dimensional resolution can be performed by constructing spherical instead of circular models.

A drawback of ToA positioning methods is the requirement for precise time synchronization of all stations. Even small issues with time synchronization may result in very large errors in the resulting positioning estimates. For example, a time measurement error as small as 100 nanoseconds can result in a localization error of 30 meters. ToA-based positioning solutions are particularly susceptible to outages in station timing sources which may cause a base station to lose time synchronization. Other positioning techniques, such as round trip timing (RTT) and Angle of Arrival (AoA) are less dependent on station time synchronization.

Figure 9:
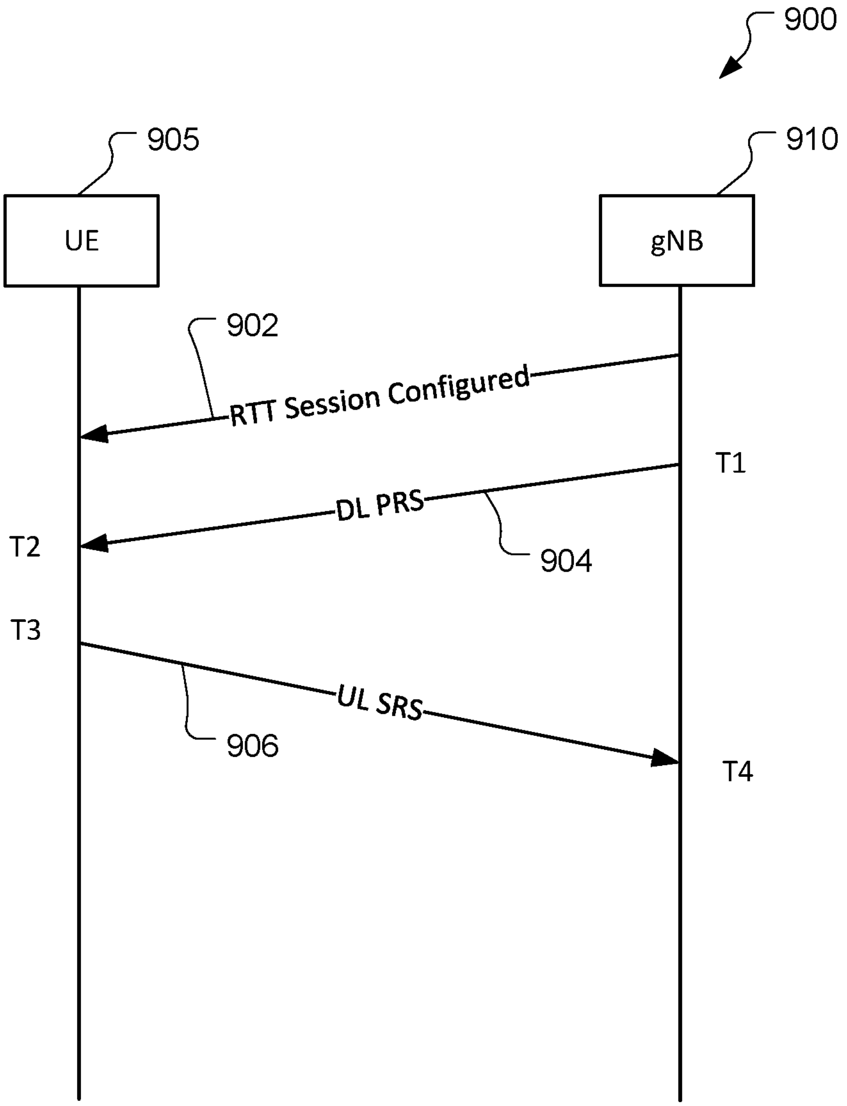
FIG. 9 is an example round trip time message flow between a user equipment and a base station.

Referring to FIG. 9, an example round trip message flow 900 between a user equipment 905 and a base station 910 is shown. The UE 905 is an example of the UE 105, 200 and the base station 910 may be a gNB 110*a-b* or ng-eNB 114. In general, RTT positioning methods utilize a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. The example message flow 900 may be initiated by the base station 910 with a RTT session configured message 902. The base station may utilize the LPP/NRPPa messaging to configure the RTT session. At time T1, the base station 910 may transmit a DL PRS 904, which is received by the UE 905 at time T2. In response, the UE 905 may transmit a Sounding Reference Signal (SRS) for positioning message 906 at time T3 which is received by the base station 910 at time T4. The distance between the UE 905 and the base station 910 may be computed as:

$$\text{distance} = \frac{c}{2}((T4 - T1) - (T3 - T2)) \tag{2}$$

where c=speed of light.

Since the UE 905 and base station 910 are exchanging messages, which may include timing information, the impact of a timing offset between the stations may be minimized. That is, the RTT procedures may be used in asynchronous networks. A drawback to RTT procedures, however, is that in dense operating environments, where there are many UEs exchanging RTT messages with base stations, the bandwidth required for the UL SRS for positioning messages may increase the messaging overhead and utilize excess network bandwidth. In this use case, passive positioning techniques may reduce the bandwidth required for positioning by eliminating transmissions from the UE.

Figure 10:
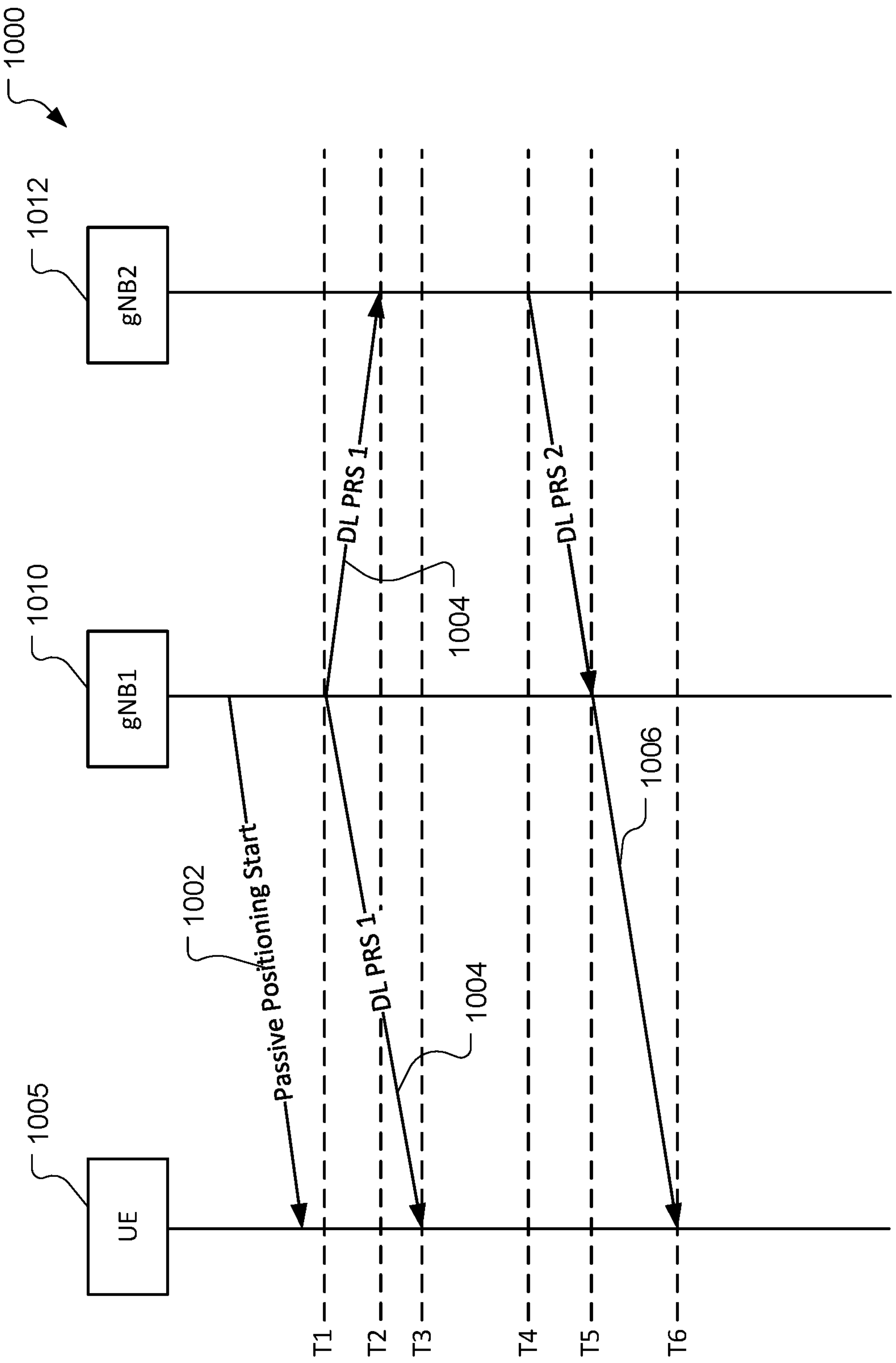
FIG. 10 is an example message flow for passive positioning of a user equipment.

Referring to FIG. 10, an example message flow 1000 for passive positioning of a user equipment 1005 is shown. The message flow includes the UE 1005, a first base station 1010 and a second base station 1012. The UE 1005 is an example of the UEs 105, 200, and the base stations 1010, 1012 are examples of the gNBs 110*a-b* or ng-eNB 114. In general, TDOA positioning techniques utilize the difference in travel times between one entity and other entities to determine relative ranges from the other entities and those, combined with known locations of the other entities, may be used to determine the location of the one entity. Angles of arrival and/or departure may be used to help determine a location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). In operation, the first base station 1010 may provide a passive positioning start message 1002 to the UE 1005. The passive positioning start message 1002 may be a broadcast message, or other signaling such as RRC, to inform the UE of a PRS transmission schedule and may include transmission information (e.g., channel information, muting patterns, PRS bandwidth, PRS identification information, etc.). At time T1, the first station may transmit a first DL PRS 1004 which may be received by the second base station 1012 at time T2 (for example), and by the UE 1005 at time T3. The second base station 1012 may be configured to transmit a second DL PRS 1006 at time T4, which is received by the first base station 1010 at time T5 and by the UE 1005 at time T6. The time between T2 and T4 may be a configured turnaround time on the second base station 1012 and thus a known period of time. The time between T1 and T2 (i.e., time of flight) may also be known because the first and second base stations 1010, 1012 are in fixed locations. The turnaround time (i.e., T4–T2) and the time of flight (i.e., T2–T1) may be broadcast or otherwise provided to the UE 1005 for use in positioning calculations. The UE 1005 may observe the difference between T6 and T3, and the distances may be computed as:

$$D_{gNB1-UE}=c((T_3-T_1)) \tag{3}$$

$$D_{gNB2-UE}=c((T_6-T_1)-(T_4-T_2)-(T_2-T_1))=c(T_6-T_4) \tag{4}$$

$$D_{gNB2-UE}-D_{gNB1-UE}=c((T_6-T_3)-(T_4-T_2)-(T_2-T_1)) \tag{5}$$

In operation, in an example, the base stations 1010, 1012 may utilize synchronized timing to compute the time of flight values. In an example, the first DL PRS 1004 and the second DL PRS 1006 may include timing information (such as in the RTT message flow 900) and thus may reduce the impact of a timing offset between the stations.

Figure 11:
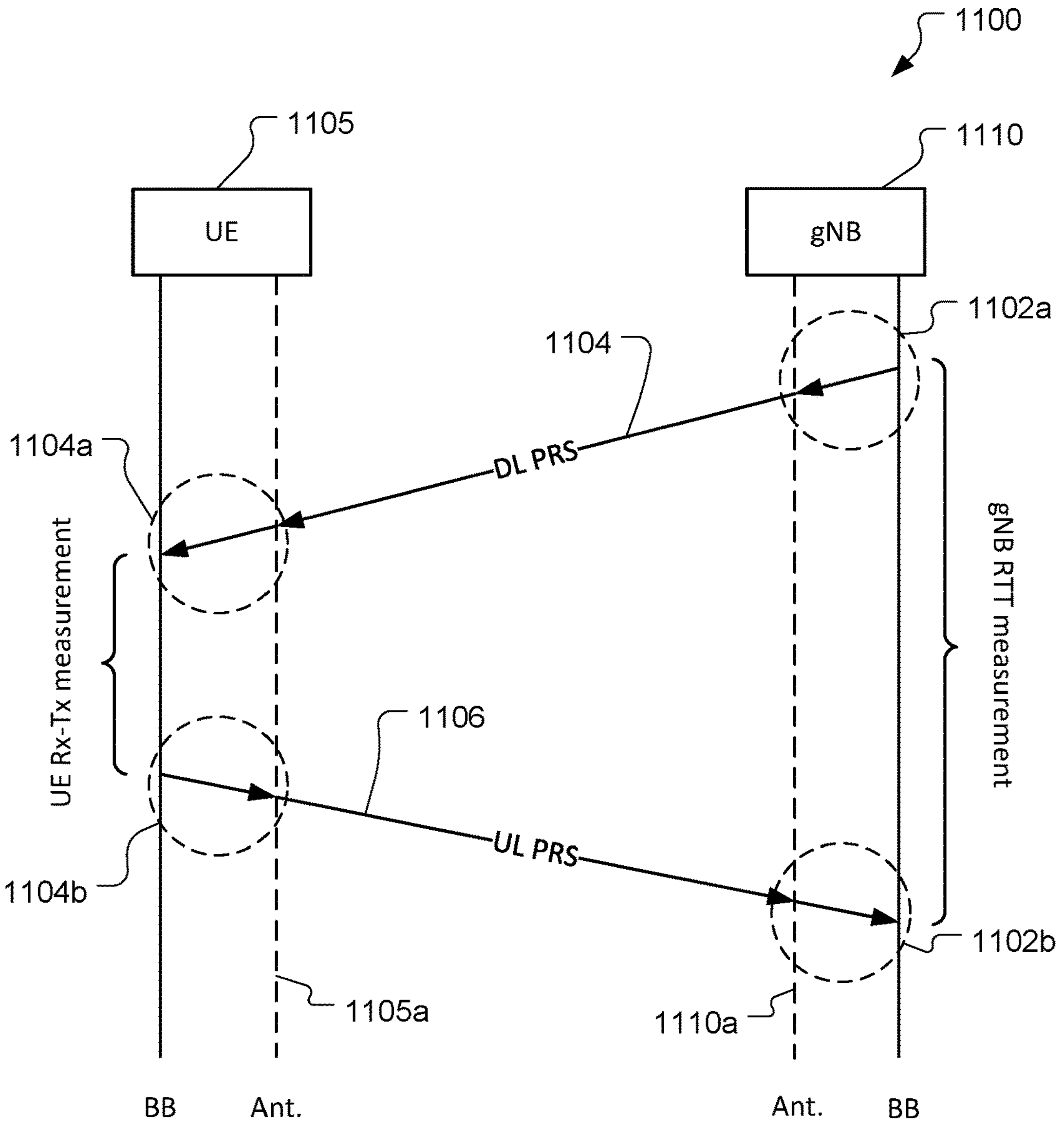
FIG. 11 is a diagram of example impacts of group delay errors in wireless transceivers.

Referring to FIG. 11, a diagram 1100 of example impacts of group delay errors within wireless transceivers are shown. The diagram 1100 depicts an example RTT exchange such as described in FIG. 9. A UE 1105, such as the UE 200, and a base station 1110, such as the gNB 110*a*, are exchanging positioning reference signals such as a downlink (DL) PRS 1104 and an uplink (UL) PRS 1106 (which may also be an UL SRS). The UE 1105 may have one or more antennas 1105*a* and associated base band processing components. Similarly, the base station 1110 may have one or more antennas 1110*a* and base band processing components. The respective internal configurations of the UE 1105 and the base station 1110 may cause delay times associated with the transmission and reception of PRS signals. In general, a group delay is a transit time of a signal through a device versus frequency. For example, a $BS_{TX}$ group delay 1102*a* represents the difference in time the base station 1110 records the transmission of the DL PRS 1106 and the time the signal leaves the antenna 1110*a*. A $BS_{RX}$ group delay 1102*b* represents the difference in time the UL PRS 1106 arrives at the antenna 1110*a* and the time the processors in the base station 1110 receive an indication of the UL PRS 1106. The UE 1105 has similar group delays such as the $UE_{RX}$ group delay 1104*a* and the $UE_{RX}$ group delay 1104*b*. The group delays associated with the network stations may create a bottleneck for terrestrial based positioning because the resulting time differences lead to inaccurate position estimates. For example, a 10 nanosecond group delay error equates to approximately a 3 meter error in the position estimate. Different frequencies may have different group delay values in a transceiver, thus different PRS resources may have different group delays. The double difference positioning methods described herein may reduce the impact of the group delays associated with network stations through the use of one or more reference nodes configured to determine the errors associated with PRS resources transmitted by network stations.

Figure 12:
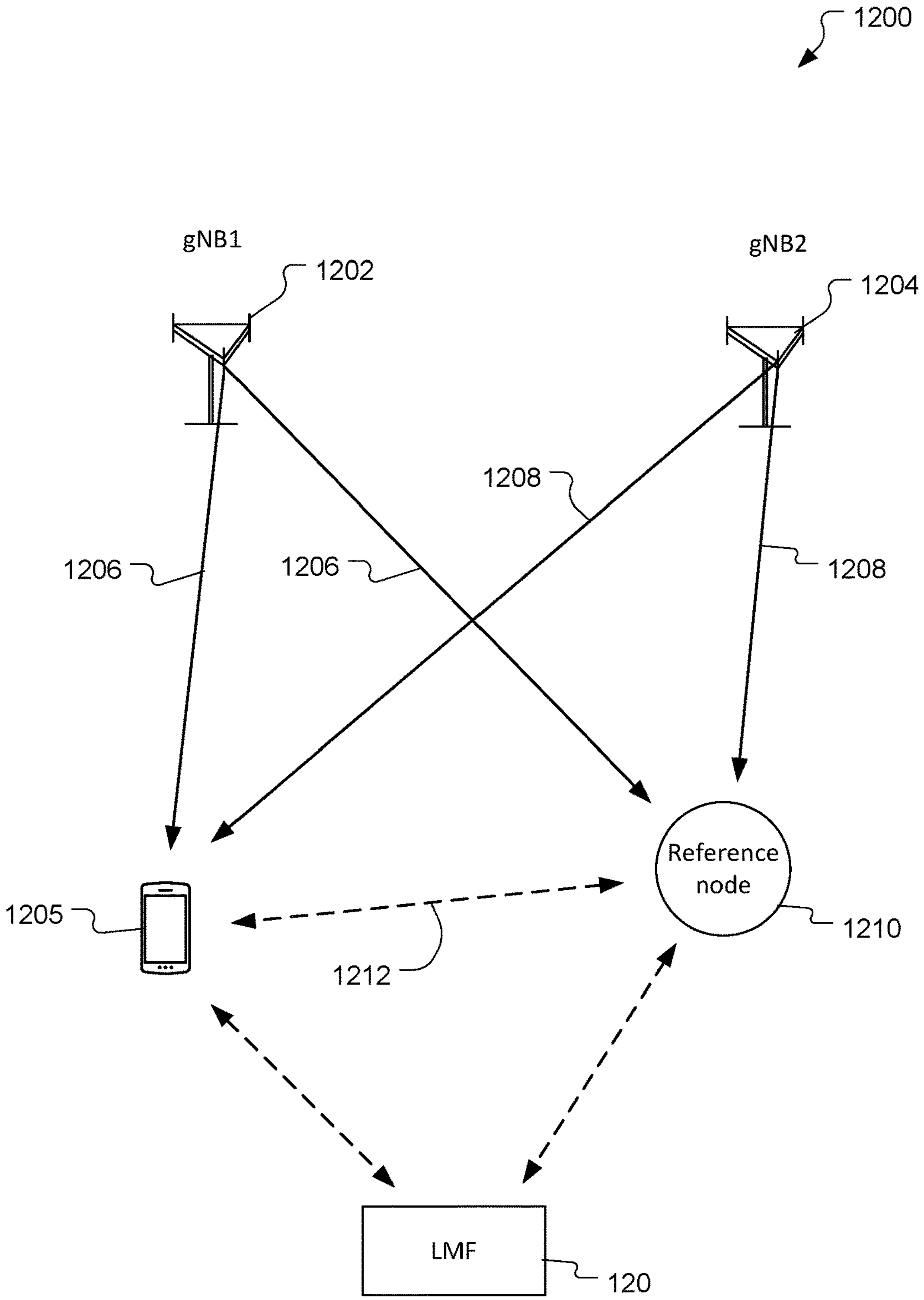
FIG. 12 is a diagram of an example double difference positioning method with a reference node.

Referring to FIG. 12, a diagram 1200 of an example double difference positioning method is shown. The diagram 1200 includes a first base station 1202, a second base station 1204, a target UE 1205, and a reference node 1210. The base stations 1202, 1204 may be considered examples of the TRP 300, such as the gNBs 110*a*, 110*b*. The target UE 1205 may include at least some of the components of the UE 200 and may be considered an example of the UE 200. The reference node 1210 may include components of the UE 200 and/or the TRP 300 and may be an example of either a UE 200 or a TRP 300, or another device configured to operate in a reference node mode and communicate in the communication system 100. For example, the target UE 1205 and the reference node 1210 may be configured to communicate with a network entity such as the LMF 120 via one or more communication protocols. (e.g., via NRPPa, LPP, etc.). In an example, the target UE 1205 and the reference node 1210 may be configured to communicate via device-to-device (D2D) link 1212. The D2D link 1212 may be based on technologies such as NR sidelink (e.g., via the physical sidelink control channel (PSCCH), physical sidelink shared channel (PSSCH)). In a vehicle-to-everything (V2X) network, the reference node 1210 may be a roadside unit (RSU), and the sidelink may be based on the PC5 protocol. Other D2D technologies may also be used.

In operation, the first base station 1202 is configured to transmit PRS resources such as a first PRS 1206 which is received by both the target UE 1205 and the reference node 1210. Preferably, the same instance of the first PRS 1206 received by the UE 1205 and reference node 1210, but different instances of the first PRS 1206 may be received by the UE 1205 and the reference node 1210. The second base station 1204 is configured to transmit PRS resources such as one or more instances of a second PRS 1208 which is received by both the target UE 1205 and the reference node 1210. The first and second PRS 1206, 1208 may be in the same or different positioning frequency layers. Since the reference node 1210 is in a known location, the expected time of arrivals (ToAs) and the reference signal timing difference (RSTD) for the first and second PRSs 1206, 1208 are known based on the propagation time of the RF signals. A delay in the actual measurements as compared to the expected ToAs may be used to determine the group delay associated with the PRSs 1206, 1208. This computed delay value may be used to compensate measurements of the PRSs 1206, 1208 for proximate mobile devices, such as the target UE 1205. In an example, the reference node 1210 may provide the compensation values associated with the first and second PRS 1206, 1208 to the LMF 120, and the target UE 1205 may obtain the compensation values from the LMF 120. In an example, the reference node 1210 may provide the compensation values via the D2D link 1212.

In an ideal installation, the reference node 1210 will have a fixed and accurate location, and will be in a position to receive all PRS being transmitted by the network stations and received by the UEs in the network. In practice, however, these conditions may not be satisfied. Variations may include, for example, the reality that a single reference node 1210 may not be able to measure all transmitted PRS. For example, due to scheduling conflicts, power consumption limitations, signal obstructions, frequency and bandwidth capabilities, etc. In another example, the reference node 1210 and the target UE 1205 may not be in positions to measure the same instance of PRSs transmitted by the base stations. The location of the reference node 1210 may change without a corresponding change to the ToA model. The ability to configure a regular UE to perform the function of a reference node provides the technical advantage of enabling new reference nodes in a network when the previously configured reference nodes cannot receive PRS. The increased number of reference nodes may increase the reliability and accuracy of the resulting position estimates.

Figure 13:
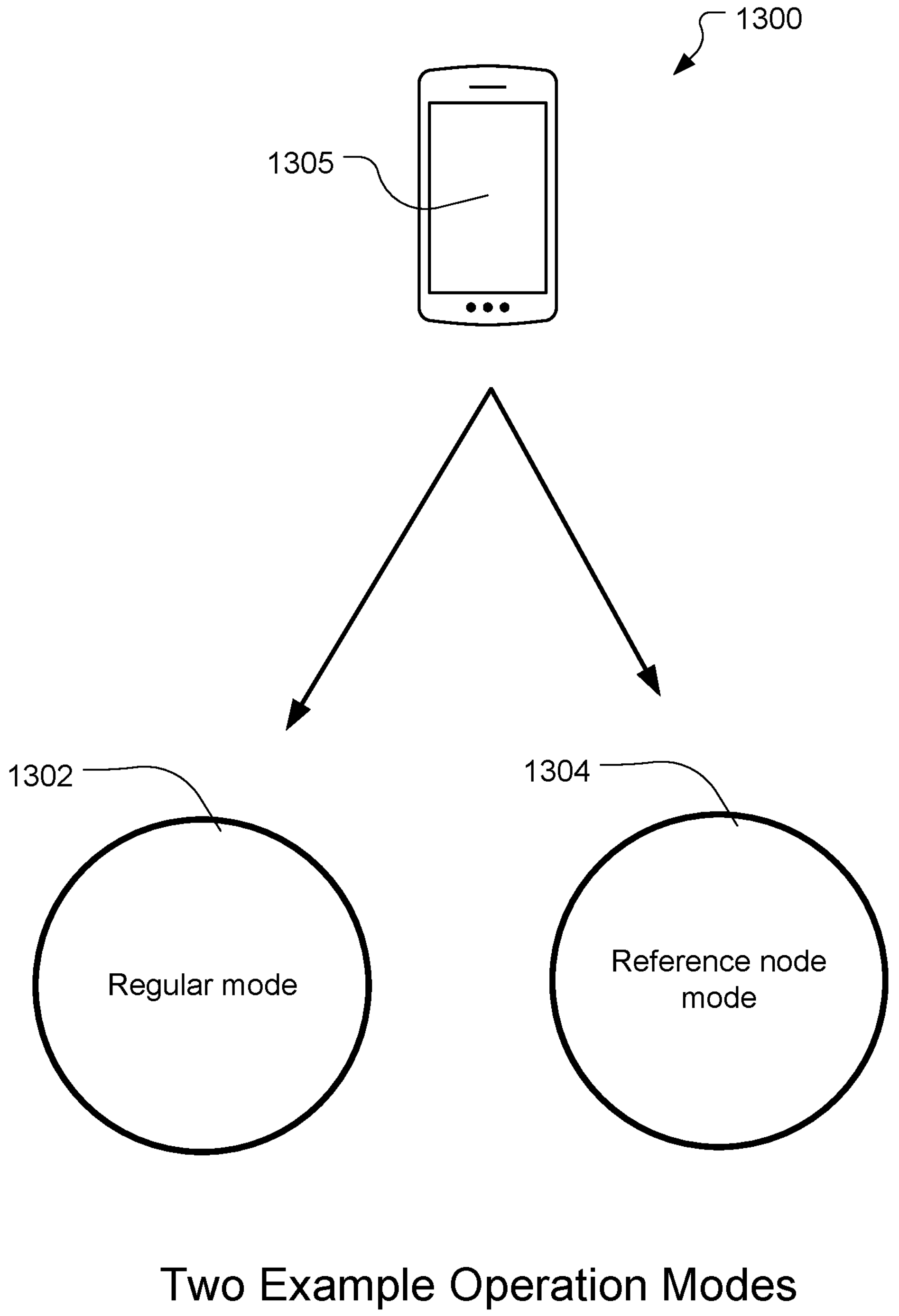
FIG. 13 is a diagram of two example modes of operation with a user equipment.

Referring to FIG. 13, with further reference to FIG. 12, a diagram 1300 of two example modes of operation with a user equipment 1305 is shown. The UE 1305 may include some or all of the components of the UE 200, and the UE 200 may be an example of the UE 1305. The UE 1305 may be configured to operate simultaneously in at least two modes including a regular mode 1302 and a reference node mode 1304. In an example, when operating in the reference node mode 1304, the processing and communication capabilities of the UE 1305 may be biased towards obtaining and reporting reference signal measurements and the UE 1305 may be configured to perform the functions of the reference node 1210 in FIG. 12. The UE 1305 may have various configurable settings which may be used to improve the positioning capabilities of the UE 1305 when in the reference node mode 1304. In an example, the processing and communications capabilities of the UE 1305 may be the same for both the regular mode 1302 and the reference node mode 1304. The UE 1305 may be configured to register with the communication system 100 (e.g., the LMF 120) to indicate it is capable of operating as a location-target device (e.g., the regular mode 1302) and as a RLD (e.g., the reference node mode 1304). In an example, the UE 1305 may report a separate capability whether the UE 1305 can simultaneously perform measurements on PRS associated with both RLD types of positioning sessions (i.e., a request that is intended for the UE 1305 to report measurements & reference location), and whether the UE 1305 can also respond to simultaneous location requests (i.e., one or more requests intended for the UE 1305 to report measurements for the purpose of determining a location of the UE 1305). The UE 1305 may report a PRS processing capability that spans across the reference node mode 1304 and the regular mode 1302. For example, if the UE receives separate DL-PRS assistance data that is intended for the reference node mode 1304, the UE 1305 may prioritize the PRS processing in the reference node mode 1304 over the assistance data received to obtain a location in the regular mode 1302, or vice versa, if the UE 1305 is not capable of processing all the PRS resources associated with the reference node mode 1304 and the regular mode 1302. In an example, the UE 1305 may be configured to report PRS processing and reporting capabilities that are different when the network requests the reference node mode capabilities of the UE 1305 as compared to regular mode processing and reporting. For example, the UE 1305 may be configured to support decoding X Gbps while in the regular mode 1302 and then support a lower amount of decoding while in the reference node mode 1304.

In an embodiment, the UE 1305 may indicate which frequency bands may be used when operating in the reference node mode 1304. For example, the UE 1305 may be configured to utilize both FR-1 and FR-2 while in the regular mode 1302, but may be limited to FR-1 while in the reference node mode 1304. The UE 1305 may utilize larger measurement gap periods (MGPs) (e.g., several hundred milliseconds as compared to tens of milliseconds) in the reference node mode 1304. While in the reference node mode 1304, the UE 1305 may be configured to prioritize PRS measurements over Radio Resource Management (RRM) measurements, and prioritize RRM while in the regular mode 1302.

Figure 14:
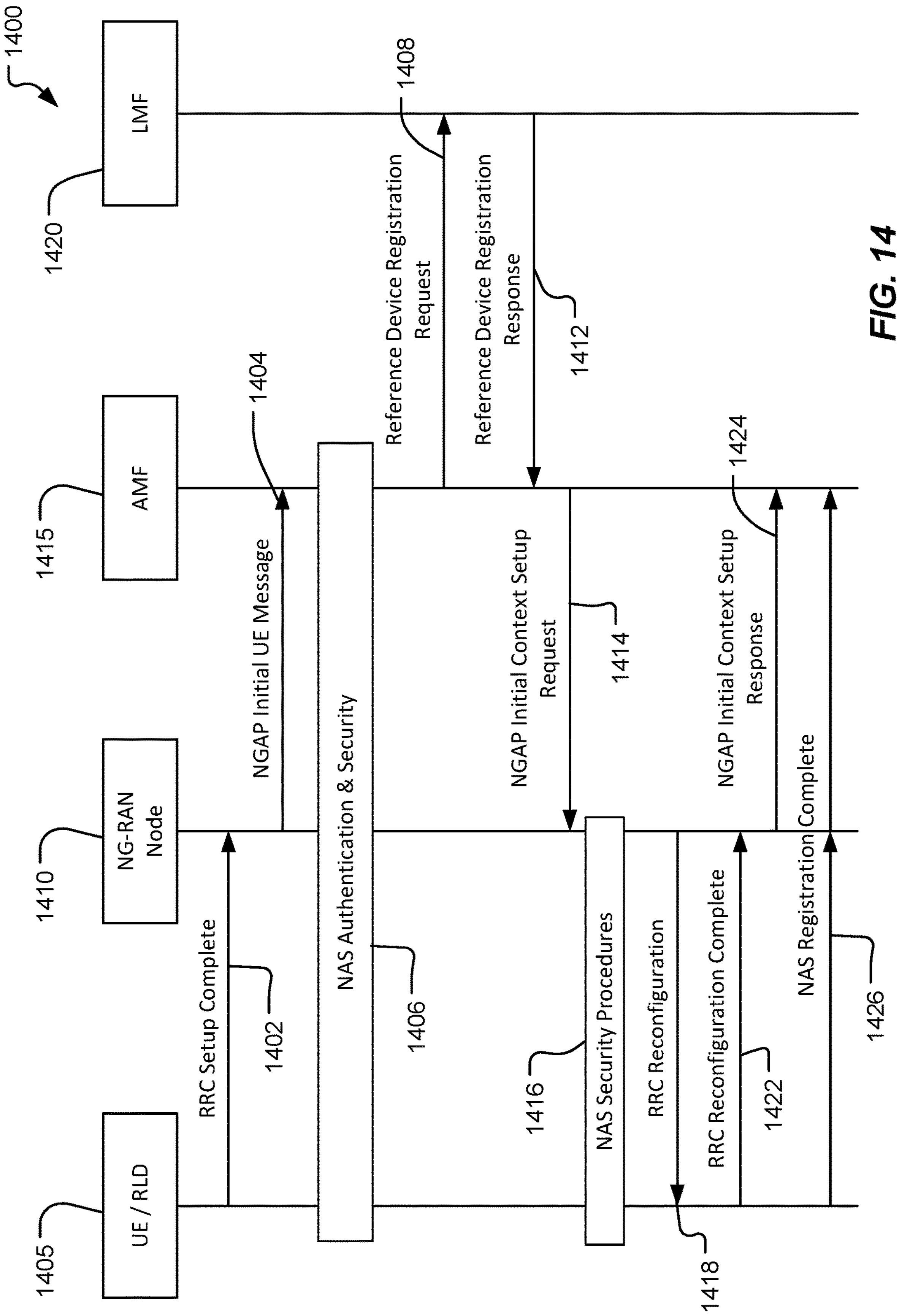
FIG. 14 is an example message flow for registering a reference device on a wireless network.

Referring to FIG. 14, an example message flow 1400 for registering a reference device on a wireless network is shown. The message flow 1400 may be used to register a UE at an LMF to operate as a reference node (e.g., RLD) and/or as a regular UE (e.g., location-target device) in the communication system 100. In an example, a UE 1405 is in communication with a NG-RAN node 1410, such as the gNBs 110*a*, 100*b* ng-eNB 114, and configured to communicate with an AMF 1415 and an LMF 1420. The UE 1405 may include some or all of the components of the UE 200, and the UE 200 is an example of the UE 1405. The UE 1405 may be configured to operate in the regular mode 1302, or the reference node mode 1304, or both modes simultaneously. The message flow 1400 may utilize other registration messages such as described in industry specifications (e.g., 3GPP TS 23.502). The registration process associated with the message flow 1400 may be used for initial registration, mobility registration updates, periodic registration updates and emergency registration. The UE 1405 is configured to send a RRC Setup Complete message 1402 including a registration request in a dedicated NAS message field. The message 1402 may include a 5G NR Global Unique Temporary Identifier (GUTI), an indication of the last visited registered Tracking Area Identity (TAI), and an indication of a capability to operate as a RLD. In response to the RRC Setup Complete message 1402, the NG-RAN node 1410 may send a NGAP Initial UE message 1404 indicating a RAN UE NGAP ID, a NAS registration request, user location information, and RRC establishment cause information. The AMF 1415 may be configured to perform a NAS Authentication and Security procedure at stage 1406. A reference device registration request message 1408 may be provided to the LMF 1420 to indicate the capabilities of the UE 1405. For example, a 5G Mobility Management (MM) capability information element may include bits to indicate whether the UE can or cannot operate as a LCS reference device (e.g., 1=can operate as LCS RefDev, 0=cannot operate as LCS RefDev). The 5GMM capability information may also indicate whether the UE 1405 may simultaneously operate in the regular mode. The LMF 1420 may be configured to provide a reference device registration response message 1412 indicating the UE 1405 is to operate as a RLD and/or a location-target device. The AMF 1415 may send a NGAP initial context setup request message 1414 based on the reference device registration response message 1412. NAS security procedures may be performed at stage 1416, and the NG-RAN node 1410 may utilize RRC procedures to provide RRC reconfiguration messages 1418 indicating the registration result. The UE 1405 may provide an RRC reconfiguration complete message 1422, and the NG-RAN node 1410 may send a NGAP initial context setup response message 1424. NAS registration complete messages 1426 may be sent to confirm the operational mode(s) of the UE 1405 (e.g., reference node mode and/or normal mode).

Figure 15:
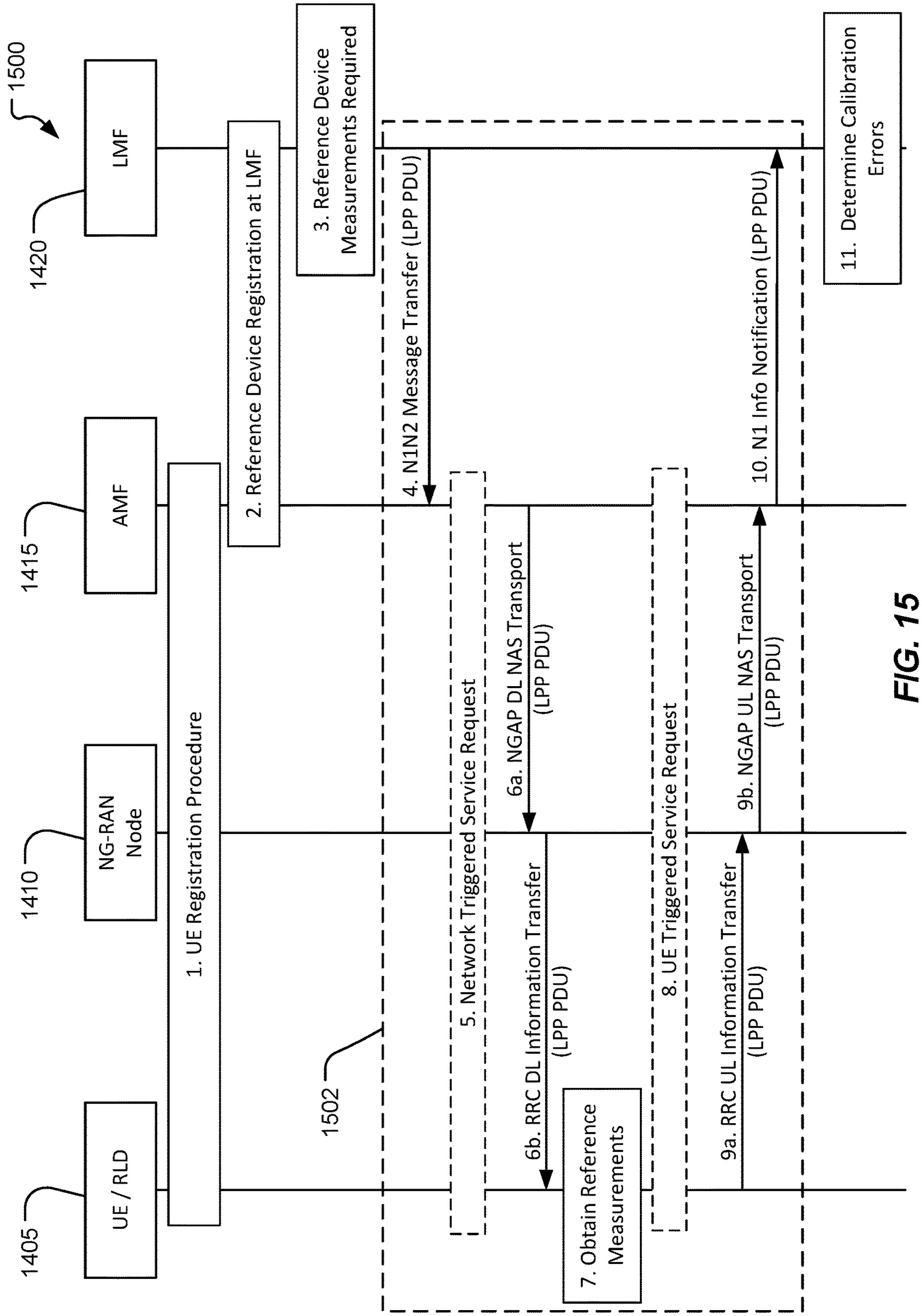
FIG. 15 is an example message flow for obtaining and reporting reference signal measurements.

Referring to FIG. 15, with further reference to FIG. 14, an example message flow 1500 for obtaining and reporting reference signal measurements is shown. At step 1, the UE 1405 may perform a registration procedure, such as depicted in FIG. 14, to register with a gNB (e.g., a NG-RAN node 1410) and the 5G core network (e.g., including the AMF 1415) as a normal UE. The UE 1405 may also provide an indication to the AMF 1415 whether the UE 1405 can function as a RLD. For example, the UE 1405 may indicate that it is capable of performing as a RLD and provide current position information including coordinates (e.g., lat/long/alt) and an uncertainty value. At step 2, the AMF 1415 registers the UE 1405 as a RLD at LMF 1420 using a Reference Device Registration Request operation towards the LMF 1420. The AMF 1415 may assign a LCS Correlation ID and provide it together with a AMF ID to the LMF 1420. The AMF ID may be used to indicate the AMF Instance serving the UE 1405. The LMF 1420 may be configured to maintain a database of RLDs such that each RLD is associated with a LCS Correlation ID and a AMF ID. The AMF 1415 may be configured to store the LCS Correlation ID for each successfully registered RLD.

At a future time, at step 3, the LMF 1420 may determine that reference measurements are needed from a particular RLD and may initiate a positioning session 1502. The positioning session 1502 may be based on a LPP PDU transfer such as described in 3GPP TS 38.305, clause 6.4.2. In an example, steps 4 to 6*b* may occur before, after, or at the same time as steps 8 to 10. Steps 4 to 6*b* and steps 8 to 10 may also be repeated. Steps 4 to 6*b* are triggered when the LMF 1420 needs to send an LPP message to the UE 1405 as part of some LPP positioning activity. At step 4, the LMF 1420 may be configured to invoke the Namf_Communication_N1N2MessageTransfer service operation towards the AMF 1415 to request the transfer of a LPP PDU to the UE 1405. The service operation includes the LPP PDU together with the LCS Correlation ID in the N1 Message Container such as defined in TS 29.518. If the UE 1405 is in CM-IDLE state (e.g. if the NG connection was previously released due to data and signaling inactivity), at step 5 the AMF 1415 may be configured to initiate a network triggered service request as defined in TS 23.502 in order to establish a signaling connection with the UE 1405 and assign a serving NG-RAN node 1410. The AMF 1415 includes a LPP PDU in the payload container of a DL NAS Transport message, and a Routing Identifier identifying the LMF 1420 in the Additional Information of the DL NAS Transport message such as defined in TS 24.501. At step 6*a*, the AMF 1415 sends the DL NAS Transport message to the serving NG-RAN Node 1410 in an NGAP Downlink NAS Transport message such as defined in TS 38.413. In an example, the AMF 1415 need not retain state information for this transfer and it can treat any response in step 9*b* as a separate non-associated transfer. At step 6*b*, the NG-RAN Node 1410 forwards the DL NAS Transport message to the UE 1405 in an RRC DL Information Transfer message. At step 7, the UE 1405 is configured to obtain measurements based at least in part on the RRC DL Information Transfer message. For example, the reference measurements may include RSRP, RSRQ, RSSI, RSTD, AoA, and other measurements associated with positioning reference signals. The reference measurements may be obtained when the UE 1405 is in a reference node mode 1304 and/or when the UE 1405 is in the regular mode 1302. For example, the UE 1405 may be configured to operate in both modes 1302, 1304 simultaneously.

In an example, steps 8 to 10 may be triggered when the UE 1405 needs to send an LPP PDU to the LMF as part of some LPP positioning activity. At step 8, if the UE 1405 is in CM-IDLE state, the UE 1405 instigates a UE 1405 triggered service request such as defined in TS 23.502 in order to establish a signaling connection with the AMF 1415 and assign a serving NG-RAN node 1410. At step 9*a*, the UE 1405 may include a LPP PDU in the payload container of an UL NAS Transport message, and the Routing Identifier, which has been received in step 6*a*, in the Additional Information of the UL NAS Transport message such as defined in TS 24.501. The UE 1405 then sends the UL NAS Transport message to the serving NG-RAN node 1410 in an RRC UL Information Transfer message. At step 9*b*, the NG-RAN node 1410 forwards the UL NAS Transport Message to the AMF 1415 in an NGAP Uplink NAS Transport message. At step 10, the AMF 1415 invokes the Namf_Communication_N1MessageNotify service operation towards the LMF 1420 indicated by the Routing Identifier received in step 9*b*. The service operation includes the LPP PDU received in step 9*b* together with the LCS Correlation ID in the N1 Message Container such as defined in TS 29.518. At step 11, the LMF 1420 may utilize the reference measurements to determine a location of the UE 1405 and/or determine calibration errors such as described in FIG. 12 when the UE 1405 is operating as an RLD.

Figure 16:
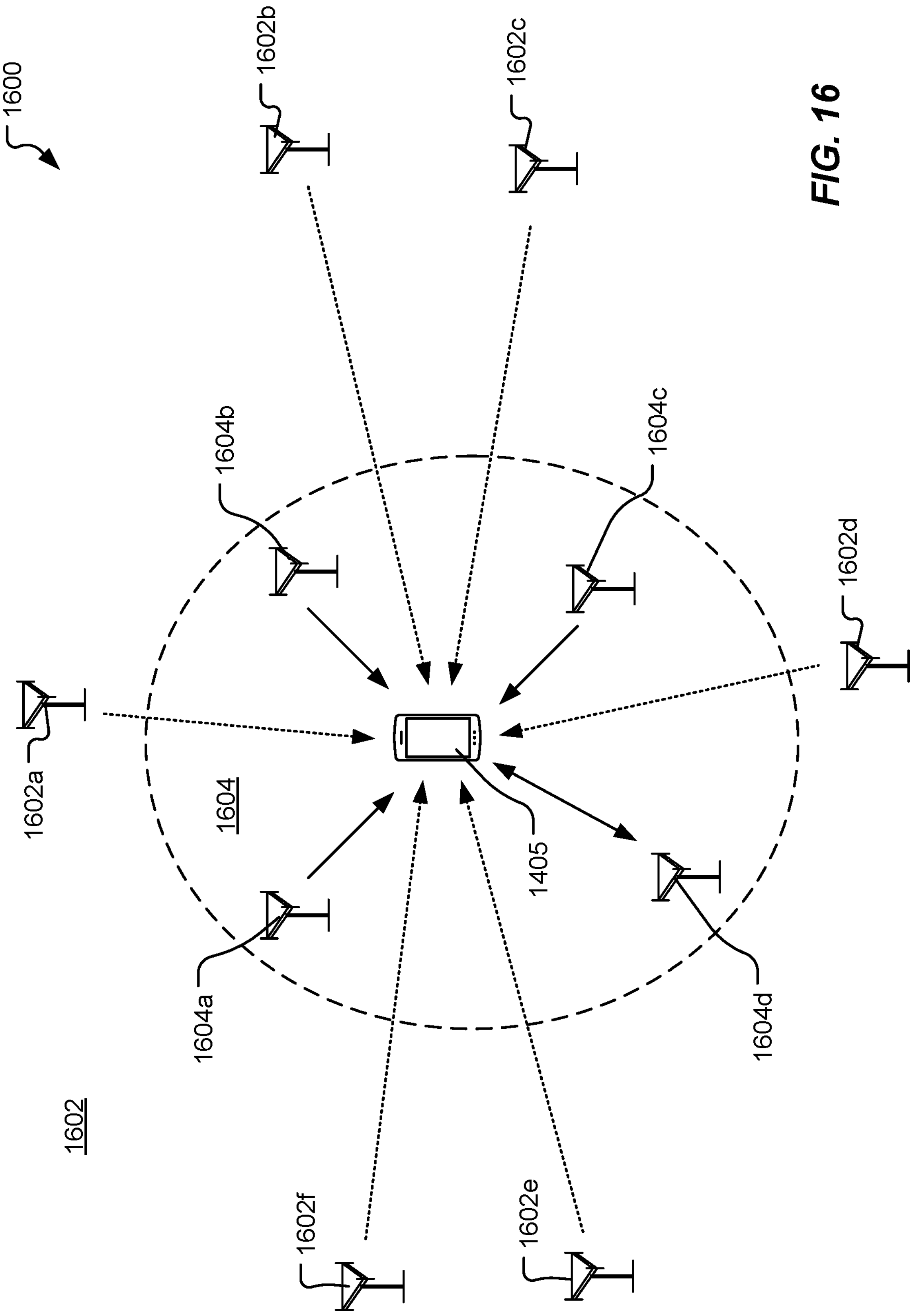
FIG. 16 is a an example diagram of a user equipment operating simultaneously as a reference location device and a location-target device.
Figure 17:
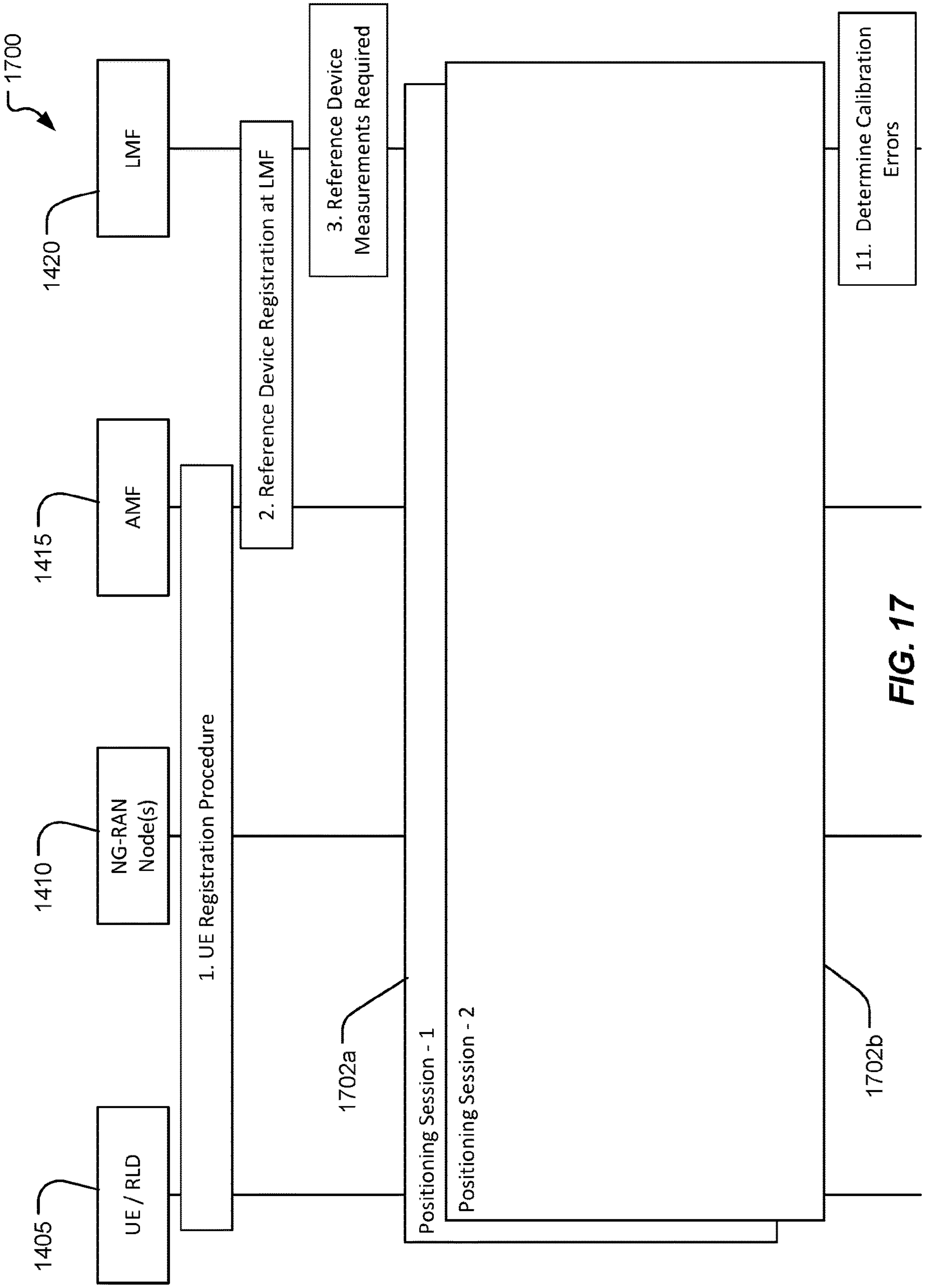
FIG. 17 is an example message flow for obtaining and reporting reference signal measurements based on two simultaneous positioning sessions.

Referring to FIG. 16, with further reference to FIG. 15, an example diagram 1600 of the user equipment 1405 operating simultaneously as a reference location device and a location-target device is shown. The diagram 1600 includes a plurality of gNBs disposed around the UE 1405 at various ranges and bearings. The location and number of the gNBs are examples, and not limitations, to demonstrate an example use case for simultaneous operation in the regular mode 1302 and the reference node mode 1304. For example, the gNBs located relatively closer to the UE 1405 may be used for improving the position estimate of the UE 1405 and the UE 1405 may be configured as a RLD to measure reference signals transmitted from gNBs located relatively further away. The diagram 1600 depicts two general geographic areas including an outer area 1602 around the UE 1405 and an inner area 1604. A first set of gNBs 1602*a-f* are disposed in the outer area 1602, and a second set of gNBs 1604*a-d* are disposed in the inner area 1604. The gNBs 1602*a-f*, 1604*a-d* may be configured to operate in different frequency bands. In operation, the LMF 1420 may be configured to initiate two simultaneous positioning sessions 1502 with the UE 1405, and the UE 1405 is configured to simultaneously obtain measurements in the regular mode 1302 and the reference node mode 1304. The second set of gNBs 1604*a-d* may transmit DL PRS and the UE 1405 is configured to measure and report the corresponding measurement values to the LMF 1420 (e.g., RSRP, RSTD, AoA, etc.). The first set of gNBs 1602*a-f* may also transmit reference signals and the UE 1405 will measure and report the corresponding measurement values to the LMF 1420. As used herein, simultaneously obtaining the measurement values for the two positioning sessions means that the UE 1405 may obtain measurements and report measurements during two or more overlapping positioning sessions. For example, referring to FIG. 17, the UE 1405 may be configured to accept a request for an new positioning session before completing a previous positioning session. The LMF 1420 may request a first positioning session 1702*a* for the UE 1405 to obtain a location as a location-target device and simultaneously request a second positioning session 1702*b* to obtain measurements from the UE 1405 performing as a RLD. The first and second positioning sessions 1702*a*, 1702*b* include the signaling as described in the positioning session 1502 in FIG. 15.

In an example, the UE 1405 may receive separate requests to measure different time-domain windows and/or PRS resources for positioning sessions as an RLD and as a location-target device. The UE 1405 may be configured to prioritize the requests based on the capabilities of the UE. For example, the UE 1405 may be capable of measuring a total of four reference signals simultaneously. In this example, the UE 1405 may determine a prioritization for obtaining an reporting the measurements. In an example, the UE 1405 may prioritize the location session and measure and report the four PRS transmitted by the second set of gNBs 1604*a*. In an example, the LMF 1420 may provide reference signal priority information in the assistance data for the positioning sessions, and the UE 1405 may measure and report based on the reference signal priority information. In an example, the UE 1405 may measure and report the requested PRS based on time-division multiplexing, such that a first set of 4 PRS are measured, then a second set of 4, and so on. Legacy UEs, which may not support simultaneous positioning sessions, may prioritize a first received request over subsequently received requests. In an example, a common DL PRS processing capability may be defined across requests for the UE 1405 operating as a RLD and a location-target device. The number of PRS a UE is capable of processing may vary based on the frequency band and/or subcarrier spacing of the PRS. The prioritization may be based on a UE's common DL PRS processing capability. Other prioritization schemes may also be used.

In an example, the positioning sessions may utilize different frequency bands. For example, the UE 1405 may receive a request to estimate a location using a high-band (e.g. mmW) to improve the quality of the position estimate for the UE. A second positioning session may request the UE 1405 to obtain measurements in the reference node mode 1304 for lower-band reference signals. Thus, the second set of gNBs 1604*a-d* may operate at a relatively higher band than the first set of gNBs 1602*a-f*. In an example, the first and second positioning sessions 1702*a*, 1702*b* may be associated with different frequency layers 700.

Figure 18:
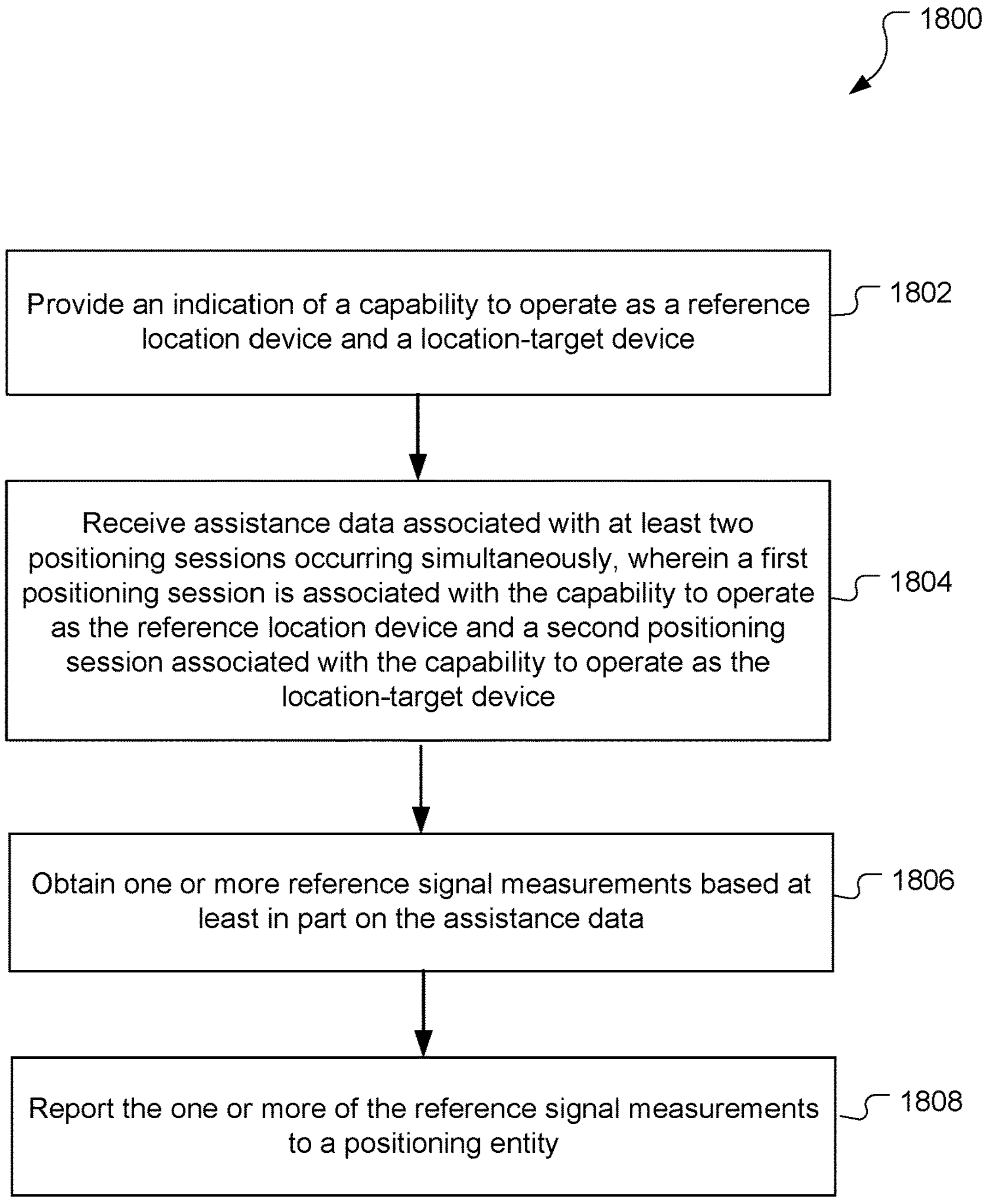
FIG. 18 is a process flow for an example method for obtaining and reporting reference signal measurements by a user equipment registered as a reference location device and a location-target device.

Referring to FIG. 18, with further reference to FIGS. 1-17, a method 1800 for obtaining and reporting reference signal measurements by a user equipment registered as a reference location device and a location-target device includes the stages shown. The method 1800 is, however, an example and not limiting. The method 1800 may be altered, e.g., by having stages added, removed, rearranged, combined, performed concurrently, and/or having single stages split into multiple stages.

At stage 1802, the method includes providing an indication of a capability to operate as a reference location device and a location-target device. A UE 200, including one or more processors 210 and a transceiver 215, is a means for providing the indication of the capability to operate as a RLD and a location-target device. The UE 200 may be configured to perform a registration process, such as described in FIG. 14 to inform the communication system 100 that the UE 200 has the capability to operate as a RLD and/or a location-target device. For example, a 5G MM capability information element may include bits to indicate whether the UE 200 can or cannot operate as a LCS reference device (e.g., 1=can operate as LCS RefDev, 0=cannot operate as LCS RefDev). The 5GMM capability information may also indicate whether the UE 200 may simultaneously operate in the regular mode.

At stage 1804, the method includes receiving assistance data associated with at least two positioning sessions occurring simultaneously, wherein a first positioning session is associated with the capability to operate as the reference location device and a second positioning session associated with the capability to operate as the location-target device. The UE 200, including the processors 210 and the transceiver 215, is a means for receiving the assistance data. In an example, the UE 200 may receive messages associated with a plurality of positioning sessions, such as the first and second positioning sessions 1702*a*, 1702*b* depicted in FIG. 17. Each positioning session may include the signaling described in FIG. 15, including the RRC DL information transfer at step 6*b*. The RRC DL information transfer includes the assistance data associated with reference signals such as PRS resource sets and PRS resources described in FIGS. 5 and 6. For example, the first positioning session 1702*a* may include assistance data for PRS transmitted from the first set of gNBs 1602*a-f* which the UE 200 may receive in a reference node mode 1304, and the second positioning session 1702*b* may include assistance data for PRS transmitted from the second set of gNBs 1604*a-d* which the UE 200 may receive in a regular mode 1302. In an example, the UE 200 may be configured with a signal mode which is capable of receiving PRS for both RLD and location-target device use cases. In an example, the first positioning session may be in a first frequency range and the second positioning session may be in a second frequency range that is different from the first frequency range.

At stage 1806, the method includes obtaining one or more reference signal measurements based at least in part on the assistance data. The UE 200, including the processors 210 and the transceiver 215, is a means for obtaining the one or more reference signal measurements. In an example, the reference signal measurements may include RSRP and RSRQ measurements of PRS transmitted from a base station, such as a gNB. Other measurements such as RSTD, ToA, and AoA may be obtained from the reference signals. The UE 200 may be configured to obtain the measurements associated with the first and second positioning sessions simultaneously. For example, one or more signal measurements may be obtained for each of the positioning sessions before any measurements for either positioning session are reported. Other sequences of obtaining and reporting the measurement values for the different positioning sessions may also be performed simultaneously (i.e., some measurements from each session may be reported while some measurements from each of the sessions are pending). In an example, the UE 200 may be configured to prioritize the reference signal measurements based on the capabilities of the UE 200 and/or a prioritization scheme established by the network (e.g., the LMF 120).

At stage 1808, the method includes reporting the one or more reference signal measurements to a positioning entity. The UE 200, including the processors 210 and the transceiver 215, is a means for reporting the one or more reference signal measurements. Each of the first and second positioning sessions may utilize the LPP PDU transfer such as described in FIG. 15, and the UE 200 may generate one or more RRC UL information transfer messages at step 9*a*. The messages may include the measurement values and associated reference signal identification information obtained at stage 1806. The positioning entity may be the LMF 1420 and may be configured to determine a location of the UE 200 and calibration errors based in part on the measurements obtained when the UE 200 is performing as a RLD, such as described in FIG. 12.

Figure 19:
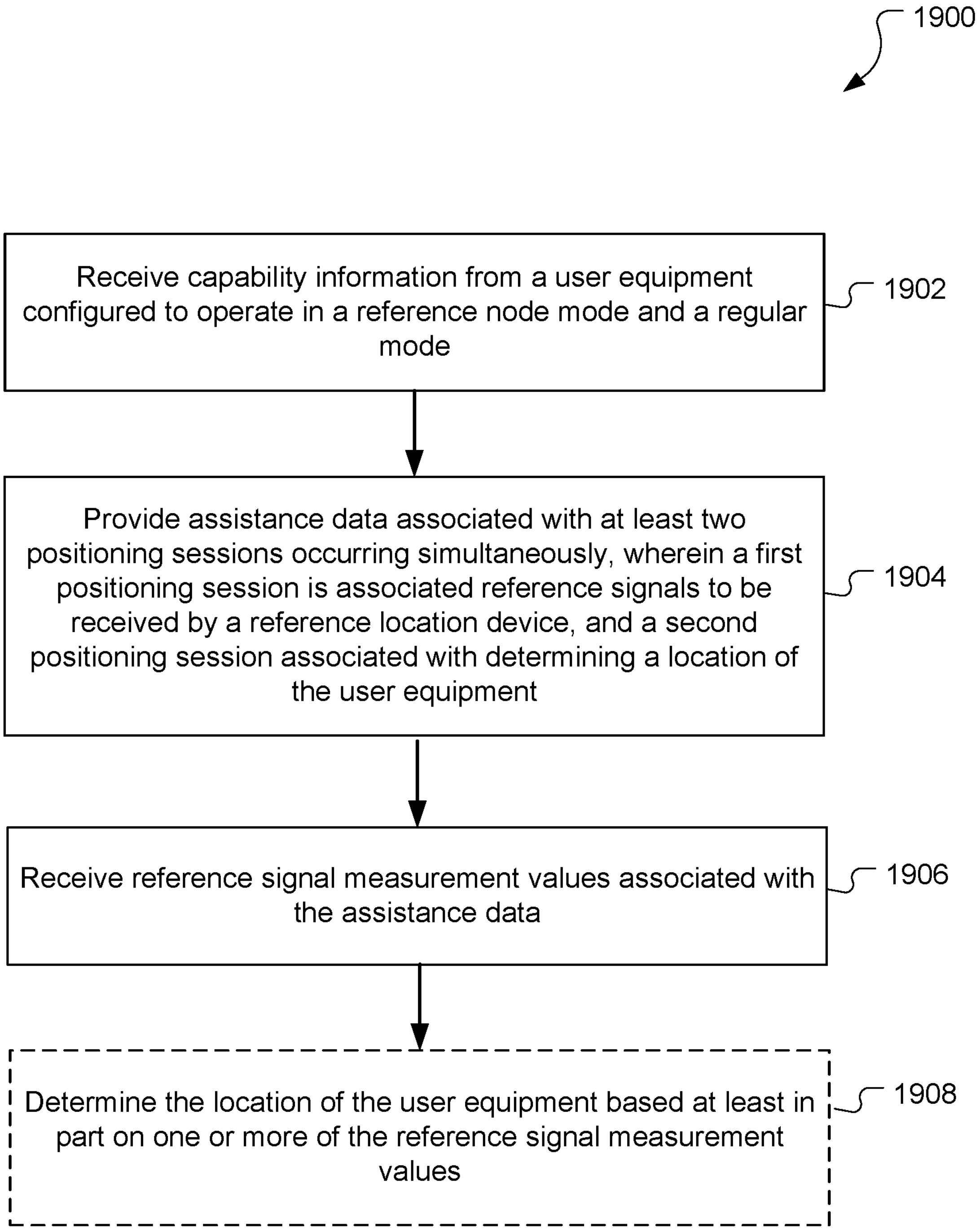
FIG. 19 is a process flow for an example method for providing assistance data and receiving reference signal measurement values from a user equipment registered as a reference location device and a location-target device.

Referring to FIG. 19, with further reference to FIGS. 1-17, a method 1900 for providing assistance data and receiving reference signal measurement values from a user equipment registered as a reference location device and a location-target device includes the stages shown. The method 1900 is, however, an example and not limiting. The method 1900 may be altered, e.g., by having stages added, removed, rearranged, combined, performed concurrently, and/or having single stages split into multiple stages. For example, determining the location of the user equipment at stage 1908 is optional.

At stage 1902, the method includes receiving capability information from a user equipment configured to operate in a reference node mode and a regular mode. A server 400 such as the LMF 1420, including a processor 410 and a transceiver 415, is a means for receiving capability information from a UE. The LMF 1420 may be configured to perform a registration process, such as described in FIG. 14, to receive configuration information from the UE 1405 that it has the capability to operate as a RLD and/or a location-target device. For example, a 5G MM capability information element may include bits to indicate whether the UE 1405 can or cannot operate as a LCS reference device (e.g., 1=can operate as LCS RefDev, 0=cannot operate as LCS RefDev). The 5GMM capability information may also indicate whether the UE 1405 may simultaneously operate in the regular mode and the reference node mode.

At stage 1904, the method includes providing assistance data associated with at least two positioning sessions occurring simultaneously, wherein a first positioning session is associated reference signals to be received by a reference location device, and a second positioning session associated with determining a location of the user equipment. The server 400, including the processor 410 and the transceiver 415, is a means for providing the assistance data. In an example, referring to FIG. 15, at step 3 the LMF 1420 may determine that reference measurements are needed from a particular RLD and may initiate a positioning session 1502. The LMF 1420 may be configured to invoke a Namf_Communication_N1N2MessageTransfer service operation towards the AMF 1415 to request the transfer of a LPP PDU to the UE 1405. The LPP PDU may include reference signal configuration information, such as PRS resource configurations, to enable the UE 1405 to measure reference signals from one or more proximate stations. The assistance data may include band information, bandwidth information, and other parameters such as described in FIGS. 6 and 7 to enable a station to measure and report PRS in a plurality of simultaneous positioning sessions. For example, the LMF 1420 may provide assistance data associated with a plurality of positioning sessions, such as the first and second positioning sessions 1702*a*, 1702*b* depicted in FIG. 17. Each positioning session may include the signaling described in FIG. 15, including the LPP PDU transfer at steps 4-6*b*. The LPP PDU may include the assistance data associated with reference signals such as PRS resource sets and PRS resources. For example, the first positioning session 1702*a* may include assistance data for PRS transmitted from the first set of gNBs 1602*a-f* which the UE 1405 may receive in a reference node mode 1304, and the second positioning session 1702*b* may include assistance data for PRS transmitted from the second set of gNBs 1604*a-d* which the UE 1405 may receive in a regular mode 1302. In an example, the UE 1405 may be configured with a single mode which is capable of receiving PRS for both RLD and location-target device use cases. In an example, the first positioning session may be in a first frequency range and the second positioning session may be in a second frequency range that is different from the first frequency range.

At stage 1906, the method includes receiving reference signal measurement values associated with the assistance data. The server 400, including the processor 410 and the transceiver 415, is a means for receiving the reference signal measurement values. In an example, the reference signal measurement values may include RSRP and RSRQ measurements of PRS transmitted from a base station, such as a gNB. Other measurements such as RSTD, ToA, and AoA may be obtained from the reference signals. The UE 1405 may be configured to obtain the measurements associated with the first and second positioning sessions simultaneously. For example, one or more signal measurements may be obtained for each of the positioning sessions before any measurements for either positioning session are reported. Other sequences of obtaining and reporting the measurement values for the different positioning sessions may also be performed simultaneously (i.e., some measurements from each session may be reported while some measurements from each of the sessions are pending). In an example, the LMF 1420 may prioritize the reference signal measurements based on the capabilities of the UE 1405 and/or a prioritization scheme established by the network (e.g., emergency protocols, network loading, mobility requirements, etc.). The UE 1405 is configured to report the reference signal measurement values. For example, each of the first and second positioning sessions may utilize the LPP PDU transfer such as described in FIG. 15, and the UE 1405 may generate one or more RRC UL information transfer messages at step 9*a* to report the measurement values to the LMF 1420. The messages may include the measurement values and associated reference signal identification information.

At stage 1908, the method optionally includes determining the location of the user equipment based at least in part on one or more of the reference signal measurement values. The server 400, including the processor 410, is a means for determining the location of the UE. In an example, the reference signal measurement values reported by the UE 1405 may be used to determine a location of the UE 1405 based on known positioning techniques such as described in FIGS. 8-10. Other techniques may also be used. In an example, the LMF 1420 may be configured to utilize the measurement values in a double difference positioning method such as described in FIG. 12, where the UE 1405 is performing as a reference node. The LMF 1420 may be configured to utilize a location reported by the UE 1405 as the reference location, and/or a position computed based on the measurement values reported during a simultaneous positioning session. For example, the LMF 1420 may utilize the first positioning session 1702*a* to determine the location of the UE 1405, and the second positioning session 1702*b* to have the UE 1405 report reference signal measurements as an RLD. The LMF 1420 may utilize the measurement values reported in the first and second positioning sessions to compensate the delay values associated with the transmitting stations.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations. For example, one or more functions, or one or more portions thereof, discussed above as occurring in the LMF 120 may be performed outside of the LMF 120 such as by the TRP 300 or the UE 200.

As used herein, the singular forms "a," "an," and "the" include the plural forms as well, unless the context clearly indicates otherwise. For example, "a processor" may include one processor or multiple processors. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure). Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements without departing from the scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

Clause 1. A method of obtaining and reporting reference signal measurements, comprising: providing an indication of a capability to operate as a reference location device and a location-target device; receiving assistance data associated with at least two positioning sessions occurring simultaneously, wherein a first positioning session is associated with the capability to operate as the reference location device and a second positioning session associated with the capability to operate as the location-target device; obtaining one or more reference signal measurements based at least in part on the assistance data; and reporting the one or more of the reference signal measurements to a positioning entity.

Clause 2. The method of clause 1 wherein the first positioning session utilizes a first frequency band and the second positioning session utilizes a second frequency band that is different than the first frequency band.

Clause 3. The method of clause 1 wherein the first positioning session utilizes a first frequency layer and the second positioning session utilizes a second frequency layer.

Clause 4. The method of clause 1 wherein the capability to operate as the reference location device is different from the capability to operate as the location-target device.

Clause 5. The method of clause 1 wherein obtaining reference signals in the second positioning session is prioritized over obtaining reference signals in the first positioning session.

Clause 6. The method of clause 1 wherein the assistance data includes reference signal priority information and obtaining the one or more reference signal measurements is based at least in part on the reference signal priority information.

Clause 7. The method of clause 1 wherein obtaining the one or more reference signal measurements includes obtaining at least a first reference signal measurement in the first positioning session then obtaining at least a second reference signal measurement in the second positioning session.

Clause 8. The method of clause 1 further comprising reporting a reference location to the positioning entity.

Clause 9. The method of clause 1 wherein the positioning entity is a location management function.

Clause 10. The method of clause 1 wherein receiving the assistance data includes receiving one or more radio resource control messages.

Clause 11. A method for receiving reference signal measurement values, comprising: receiving capability information from a user equipment configured to operate in a reference node mode and a regular mode; providing assistance data associated with at least two positioning sessions occurring simultaneously, wherein a first positioning session is associated reference signals to be received by a reference location device, and a second positioning session associated with determining a location of the user equipment; and receiving reference signal measurement values associated with the assistance data.

Clause 12. The method of clause 11 wherein the first positioning session utilizes a first frequency band and the second positioning session utilizes a second frequency band that is different than the first frequency band.

Clause 13. The method of clause 11 wherein the first positioning session utilizes a first frequency layer and the second positioning session utilizes a second frequency layer.

Clause 14. The method of clause 11 wherein the capabilities of the user equipment operating in the reference node mode are different from the capabilities of the user equipment operating in the regular mode.

Clause 15. The method of clause 11 wherein receiving the reference signal measurement values includes receiving only reference signal measurement values associated with the second positioning session.

Clause 16. The method of clause 11 wherein the assistance data includes reference signal priority information.

Clause 17. The method of clause 11 wherein receiving the reference signal measurement values includes receiving reference signal measurement values associated with the first positioning session then receiving reference signal measurement values associated with the second positioning session.

Clause 18. The method of clause 11 further receiving a reference location of the user equipment.

Clause 19. The method of clause 11 further comprising determining the location of the user equipment based at least in part on one or more of the reference signal measurement values.

Clause 20. An apparatus, comprising: a memory; at least one transceiver; at least one processor communicatively coupled to the memory and the at least one transceiver, and configured to: provide an indication of a capability to operate as a reference location device and a location-target device; receive assistance data associated with at least two positioning sessions occurring simultaneously, wherein a first positioning session is associated with the capability to operate as the reference location device and a second positioning session associated with the capability to operate as the location-target device; obtain one or more reference signal measurements based at least in part on the assistance data; and report the one or more of the reference signal measurements to a positioning entity.

Clause 21. The apparatus of clause 20 wherein the first positioning session utilizes a first frequency band and the second positioning session utilizes a second frequency band that is different than the first frequency band.

Clause 22. The apparatus of clause 20 wherein the first positioning session utilizes a first frequency layer and the second positioning session utilizes a second frequency layer.

Clause 23. The apparatus of clause 20 wherein the capability to operate as the reference location device is different from the capability to operate as the location-target device.

Clause 24. The apparatus of clause 20 wherein the at least one processor is further configured to prioritize obtaining reference signals in the second positioning session over obtaining reference signals in the first positioning session.

Clause 25. The apparatus of clause 20 wherein the assistance data includes reference signal priority information and the at least one processor is further configured to obtain the one or more reference signal measurements based at least in part on the reference signal priority information.

Clause 26. The apparatus of clause 20 wherein the at least one processor is further configured to obtain at least a first reference signal measurement in the first positioning session then obtain at least a second reference signal measurement in the second positioning session.

Clause 27. The apparatus of clause 20 wherein the at least one processor is further configured to report a reference location to the positioning entity.

Clause 28. The apparatus of clause 20 wherein the positioning entity is a location management function.

Clause 29. The apparatus of clause 20 wherein the at least one processor is further configured to receive one or more radio resource control messages.

Clause 30. An apparatus, comprising: a memory; at least one transceiver; at least one processor communicatively coupled to the memory and the at least one transceiver, and configured to: receive capability information from a user equipment configured to operate in a reference node mode and a regular mode; provide assistance data associated with at least two positioning sessions occurring simultaneously, wherein a first positioning session is associated reference signals to be received by a reference location device, and a second positioning session associated with determining a location of the user equipment; and receive reference signal measurement values associated with the assistance data.

Clause 31. The apparatus of clause 30 wherein the first positioning session utilizes a first frequency band and the second positioning session utilizes a second frequency band that is different than the first frequency band.

Clause 32. The apparatus of clause 30 wherein the first positioning session utilizes a first frequency layer and the second positioning session utilizes a second frequency layer.

Clause 33. The apparatus of clause 30 wherein the capabilities of the user equipment operating in the reference node mode are different from the capabilities of the user equipment operating in the regular mode.

Clause 34. The apparatus of clause 30 wherein the at least one processor is further configured to receive only reference signal measurement values associated with the second positioning session.

Clause 35. The apparatus of clause 30 wherein the assistance data includes reference signal priority information.

Clause 36. The apparatus of clause 30 wherein the at least one processor is further configured to receive reference signal measurement values associated with the first positioning session then receive reference signal measurement values associated with the second positioning session.

Clause 37. The apparatus of clause 30 wherein the at least one processor is further configured to receive a reference location of the user equipment.

Clause 38. The apparatus of clause 30 wherein the at least one processor is further configured to determine the location of the user equipment based at least in part on one or more of the reference signal measurement values.

Clause 39. An apparatus for obtaining and reporting reference signal measurements, comprising: means for providing an indication of a capability to operate as a reference location device and a location-target device; means for receiving assistance data associated with at least two positioning sessions occurring simultaneously, wherein a first positioning session is associated with the capability to operate as the reference location device and a second positioning session associated with the capability to operate as the location-target device; means for obtaining one or more reference signal measurements based at least in part on the assistance data; and means for reporting the one or more of the reference signal measurements to a positioning entity.

Clause 40. An apparatus for receiving reference signal measurement values, comprising: means for receiving capability information from a user equipment configured to operate in a reference node mode and a regular mode; means for providing assistance data associated with at least two positioning sessions occurring simultaneously, wherein a first positioning session is associated reference signals to be received by a reference location device, and a second positioning session associated with determining a location of the user equipment; and means for receiving reference signal measurement values associated with the assistance data.

Clause 41. A non-transitory processor-readable storage medium comprising processor-readable instructions configured to cause one or more processors to obtain and report reference signal measurements, comprising code for: providing an indication of a capability to operate as a reference location device and a location-target device; receiving assistance data associated with at least two positioning sessions occurring simultaneously, wherein a first positioning session is associated with the capability to operate as the reference location device and a second positioning session associated with the capability to operate as the location-target device; obtaining one or more reference signal measurements based at least in part on the assistance data; and reporting the one or more of the reference signal measurements to a positioning entity.

Clause 42. A non-transitory processor-readable storage medium comprising processor-readable instructions configured to cause one or more processors to receive reference signal measurement values, comprising code for: receiving capability information from a user equipment configured to operate in a reference node mode and a regular mode; providing assistance data associated with at least two positioning sessions occurring simultaneously, wherein a first positioning session is associated reference signals to be received by a reference location device, and a second positioning session associated with determining a location of the user equipment; and receiving reference signal measurement values associated with the assistance data.

The invention claimed is:

1. A method of obtaining and reporting reference signal measurements, comprising:

providing an indication of a capability to operate as a reference location device and a location-target device;

receiving assistance data associated with at least two positioning sessions occurring simultaneously, wherein a first positioning session is associated with the capability to operate as the reference location device and a second positioning session associated with the capability to operate as the location-target device;

obtaining one or more reference signal measurements based at least in part on the assistance data; and reporting the one or more of the reference signal measurements to a positioning entity.

2. The method of claim 1 wherein the first positioning session utilizes a first frequency band and the second positioning session utilizes a second frequency band that is different than the first frequency band.

3. The method of claim 1 wherein the first positioning session utilizes a first frequency layer and the second positioning session utilizes a second frequency layer.

4. The method of claim 1 wherein the capability to operate as the reference location device is different from the capability to operate as the location-target device.

5. The method of claim 1 wherein obtaining reference signals in the second positioning session is prioritized over obtaining reference signals in the first positioning session.

6. The method of claim 1 wherein the assistance data includes reference signal priority information and obtaining the one or more reference signal measurements is based at least in part on the reference signal priority information.

7. The method of claim 1 wherein obtaining the one or more reference signal measurements includes obtaining at least a first reference signal measurement in the first positioning session then obtaining at least a second reference signal measurement in the second positioning session.

8. The method of claim 1 further comprising reporting a reference location to the positioning entity.

9. The method of claim 1 wherein the positioning entity is a location management function.

10. The method of claim 1 wherein receiving the assistance data includes receiving one or more radio resource control messages.

11. A method for receiving reference signal measurement values, comprising:

receiving capability information from a user equipment configured to operate in a reference node mode and a regular mode;

providing assistance data associated with at least two positioning sessions occurring simultaneously, wherein a first positioning session is associated reference signals to be received by a reference location device, and a second positioning session associated with determining a location of the user equipment; and receiving reference signal measurement values associated with the assistance data.

12. The method of claim 11 wherein the first positioning session utilizes a first frequency band and the second positioning session utilizes a second frequency band that is different than the first frequency band.

13. The method of claim 11 wherein the first positioning session utilizes a first frequency layer and the second positioning session utilizes a second frequency layer.

14. The method of claim 11 wherein capabilities of the user equipment operating in the reference node mode are different from capabilities of the user equipment operating in the regular mode.

15. The method of claim 11 wherein receiving the reference signal measurement values includes receiving only reference signal measurement values associated with the second positioning session.

16. The method of claim 11 wherein the assistance data includes reference signal priority information.

17. The method of claim 11 wherein receiving the reference signal measurement values includes receiving reference signal measurement values associated with the first positioning session then receiving reference signal measurement values associated with the second positioning session.

18. The method of claim 11 further receiving a reference location of the user equipment.

19. The method of claim 11 further comprising determining the location of the user equipment based at least in part on one or more of the reference signal measurement values.

20. An apparatus, comprising:

a memory;

at least one transceiver;

at least one processor communicatively coupled to the memory and the at least one transceiver, and configured to:

provide an indication of a capability to operate as a reference location device and a location-target device;

receive assistance data associated with at least two positioning sessions occurring simultaneously, wherein a first positioning session is associated with the capability to operate as the reference location device and a second positioning session associated with the capability to operate as the location-target device;

obtain one or more reference signal measurements based at least in part on the assistance data; and report the one or more reference signal measurements to a positioning entity.

21. The apparatus of claim 20 wherein the at least one processor is further configured to prioritize obtaining reference signals in the second positioning session over obtaining reference signals in the first positioning session.

22. The apparatus of claim 20 wherein the assistance data includes reference signal priority information and the at least one processor is further configured to obtain the one or more reference signal measurements based at least in part on the reference signal priority information.

23. The apparatus of claim 20 wherein the at least one processor is further configured to obtain at least a first reference signal measurement in the first positioning session then obtain at least a second reference signal measurement in the second positioning session.

24. The apparatus of claim 20 wherein the at least one processor is further configured to report a reference location to the positioning entity.

25. The apparatus of claim 20 wherein the at least one processor is further configured to receive one or more radio resource control messages.

26. An apparatus, comprising:

a memory;

at least one transceiver;

at least one processor communicatively coupled to the memory and the at least one transceiver, and configured to:

receive capability information from a user equipment configured to operate in a reference node mode and a regular mode;

provide assistance data associated with at least two positioning sessions occurring simultaneously, wherein a first positioning session is associated reference signals to be received by a reference location device, and a second positioning session associated with determining a location of the user equipment; and receive reference signal measurement values associated with the assistance data.

27. The apparatus of claim 26 wherein the at least one processor is further configured to receive only reference signal measurement values associated with the second positioning session.

28. The apparatus of claim 26 wherein the assistance data includes reference signal priority information.

29. The apparatus of claim 26 wherein the at least one processor is further configured to receive reference signal measurement values associated with the first positioning session then receive reference signal measurement values associated with the second positioning session.

30. The apparatus of claim 26 wherein the at least one processor is further configured to determine the location of the user equipment based at least in part on one or more of the reference signal measurement values.

* * * * *